(12) United States Patent
Landig et al.

(10) Patent No.: US 11,867,973 B2
(45) Date of Patent: Jan. 9, 2024

(54) HIGH RELIABILITY VARIFOCAL ELECTROSTATIC LENS

(71) Applicant: META PLATFORMS TECHNOLOGIES, LLC, Menlo Park, CA (US)

(72) Inventors: Renate Eva Klementine Landig, Seattle, WA (US); Christopher Stipe, Woodinville, WA (US); Kenneth Diest, Kirkland, WA (US); Andrew John Ouderkirk, Kirkland, WA (US); Maik Andre Scheller, Redmond, WA (US); Sheng Ye, Redmond, WA (US); John Cooke, Bothell, WA (US); Yigit Menguc, Redmond, WA (US); Nagi Elabbasi, Menlo Park, CA (US); James Ransley, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 381 days.

(21) Appl. No.: 17/014,336

(22) Filed: Sep. 8, 2020

(65) Prior Publication Data
US 2021/0080688 A1  Mar. 18, 2021

Related U.S. Application Data

(60) Provisional application No. 62/901,748, filed on Sep. 17, 2019.

(51) Int. Cl.
*G02B 7/10* (2021.01)
*G03B 13/36* (2021.01)
*H04N 23/55* (2023.01)

(52) U.S. Cl.
CPC .............. *G02B 7/10* (2013.01); *G03B 13/36* (2013.01); *H04N 23/55* (2023.01)

(58) Field of Classification Search
CPC .......... G02B 3/14; G02B 7/10; G02B 26/004; G02B 1/041; G02B 27/0172; G03B 13/36;
(Continued)

(56) References Cited

U.S. PATENT DOCUMENTS

| 7,672,059 B2 | 3/2010 | Batchko et al. |
| 8,755,124 B2 | 6/2014 | Aschwanden et al. |

(Continued)

OTHER PUBLICATIONS

Maffli, Luc, "Fluidically-coupled dielectric elastomer actuator structures for tunable optics and microfluidics", PhD Thesis, 2014, 187 pages.
(Continued)

*Primary Examiner* — Thomas K Pham
*Assistant Examiner* — Kuei-Jen L Edenfield
(74) *Attorney, Agent, or Firm* — Greenberg Traurig, LLP

(57) ABSTRACT

A varifocal lens includes a substrate having an inclined region, a primary electrode disposed over the inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a fluid between the membrane and the substrate, wherein a surface of the dielectric layer facing the secondary electrode comprises a textured surface.

13 Claims, 29 Drawing Sheets

(58) Field of Classification Search
CPC .... H04N 5/2254; H04N 23/55; H01L 21/336; G02C 7/085; B81B 3/001; G06F 3/016
USPC ............. 359/253, 676, 819, 200.5, 665, 666
See application file for complete search history.

(56) References Cited

U.S. PATENT DOCUMENTS

| | | | |
|---|---|---|---|
| 9,478,727 B2 | 10/2016 | Bose et al. | |
| 2012/0026596 A1* | 2/2012 | Berge | G02B 26/005 359/665 |
| 2019/0346593 A1* | 11/2019 | Lee | G03B 5/04 |
| 2020/0043550 A1* | 2/2020 | Kenyon | H01L 45/1625 |

OTHER PUBLICATIONS

Gebbers et al., "Zipping it up: DEAs independent of the elastomer's electric breakdown field", Proceedings of SPIE—The International Society for Optical Engineering, vol. 8340, Mar. 2012, 15 pages.

Stevens et al., "A review of adjustable lenses for head mounted displays", Proc. of SPIE, vol. 10335, Sep. 12, 2017, 20 pages.

Gui et al., "The effect of surface roughness on direct wafer bonding", Journal of Applied Physics, vol. 85, No. 10, May 15, 1999, 7 pages.

Akbari et al., "Improved electromechanical beharior in castable dielectric elastomer actuators", Applied Physics Letters, vol. 102, Article 071906, 2013, 6 pages.

Biggs et al., "Electroactive polymers: developments of and perspectives for dielectric elastomers", Angewandte Chemie, Jul. 21, 2013, 2 pages.

Wang et al., "Engineering Electroactive Dielectric Elastomers for Miniature Electrochemical Transducers", Polymers Reviews, 2017, 3 pages.

Christianson et al., "Translucent soft robots driven by frameless fluid electrode dielectric elastomer actuators", Science Robotics, vol. 3, No. 17, Apr. 25, 2018, 9 pages.

Wong et al., "Bioinspired self-repairing slippery surfaces with pressure-stable ominphobicity", Nature, vol. 477, Sep. 22, 2011, pp. 443-447.

* cited by examiner

HIGH RELIABILITY VARIFOCAL ELECTROSTATIC LENS

CROSS-REFERENCE TO RELATED APPLICATION

This application claims the benefit of priority under 35 U.S.C. § 119(e) of U.S. Provisional Application No. 62/901,748, filed Sep. 17, 2019, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
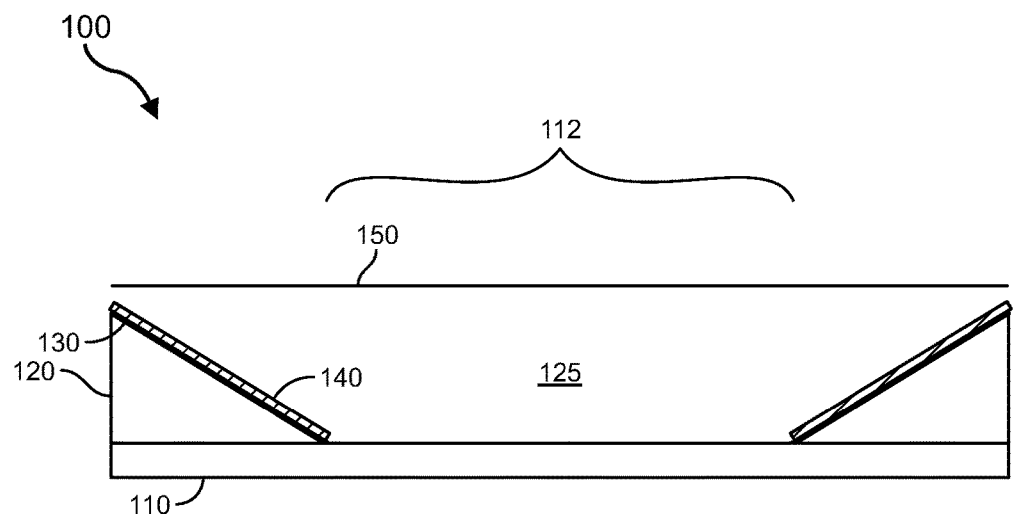
FIG. 1 is a cross-sectional schematic illustration of a varifocal electrostatic lens including a dielectric layer disposed between conductive electrodes and over a sloped support located peripheral to an optically active area of the lens according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is directed generally to liquid lenses and more particularly to adjustable liquid lenses having electrostatically-driven membranes. Adjustable lenses may be used to vary the focal length in exemplary optical systems. In accordance with various embodiments, an adjustable lens may be implemented using the principle of electrostatic zipping of a fluid filled pouch, where a laterally-moving zipping actuator may be used to generate displacement of a lens membrane and tunable operation of the lens.

Electrostatic zipping actuators may be implemented in various devices, including liquid lenses, to provide high forces and large displacements. As will be appreciated, however, such actuators may disadvantageously exhibit high pull-in voltages due in part to a minimum achievable electrode gap. In addition, in certain aspects, dynamic fluid flow particularly through small channels or gaps within the lens and/or static friction such as between one or more actuator electrodes and an intervening dielectric layer may inhibit the realization of continuously-tunable, rapidly adjustable operation. Moreover, defects in the dielectric layer, which are ubiquitous in the manufacture of such materials or which may be formed during operation, may adversely affect the electrical performance of the electrostatic actuator. Notwithstanding recent developments, the realization of high reliability varifocal electrostatic lenses capable of rapid and repeated actuation would be beneficial.

The following will provide, with reference to FIGS. 1-49, detailed descriptions of adjustable liquid lens architectures and systems using adjustable lenses. The discussion associated with FIGS. 1-15 includes a description of example varifocal electrostatic lens geometries and their design during various modes of operation. The discussion associated with FIG. 16 includes a description of the adhesion dynamics between components of an electrostatically operated lens. The discussion associated with FIG. 17 includes a description of an example driving scheme for a varifocal electrostatic lens according to certain embodiments. The discussion associated with FIGS. 18-23 includes a description of example electrode configurations in accordance with various embodiments. The discussion associated with FIG. 24 includes a description of the implementation of drainage channels to mediate the hydrodynamics of a lens fluid during various modes of operation of an electrostatic lens. The discussion associated with FIGS. 25-30 includes a description of varifocal electrostatic lens architectures including an elastic spacer located between paired electrodes. The discussion associated with FIGS. 31-35 includes a description of displacement profiles for a further example varifocal electrostatic lens. The discussion associated with FIGS. 36 and 37 includes a description of the sensitivity in optical performance of varifocal lenses to geometric tolerances in the electrode shape. The discussion associated with FIGS. 38 and 39 relates to the effect of adding a reinforcement layer to the top surface of a lens membrane. The discussion associated with FIGS. 40 and 41 relates to the effect of electrode thickness on the performance of a varifocal lens. The discussion associated with FIGS. 42-44 includes a description of the addition of a secondary fluid volume to the varifocal electrostatic lens design. The discussion associated with FIGS. 45-49 relates to exemplary virtual reality and augmented reality device architectures that may include one or more varifocal electrostatic lenses as disclosed herein.

An electrostatic lens may include a pair of conductive electrodes and one or more dielectric layers disposed between the electrodes where the electrode-dielectric layer-electrode stack may be located proximate to a transparent membrane of a liquid lens. Referring to FIG. 1, an example electrostatic lens 100 may include a transparent substrate 110, an inclined (i.e., sloped) support 120 located peripheral to an optical aperture 112 of lens 100, a primary electrode 130 disposed over the sloped support 120, and a dielectric layer 140 disposed over the primary electrode 130. A deformable transparent membrane 150 may extend over the optical aperture 112 of the lens and may include a secondary electrode (not shown) located on either the bottom (inner) or top (outer) surface of the transparent membrane 150 and proximate to the primary electrode 130.

In various aspects, a surface of the support 120 may be "inclined" with respect to a major surface of the membrane 150. The secondary electrode may be located within a peripheral region of the transparent membrane, outside of the optical aperture 112, for example. Transparent membrane 150 may be configured to contain a dielectric fluid (i.e., lens fluid) 125 between the membrane 150 and the substrate 110.

The geometry of a sloped support (e.g., sloped support 120) may be designed using a Bézier curve. A Bézier curve may be defined by a set of control points $P_0$ through $P_n$ that determine its shape. In accordance with various embodiments, a quadratic or higher order Bézier curve (e.g., created using control points $P_0$-$P_3$) may be used to model and design the profile of a sloped support so as to generate a stable optical response in the electrostatic lens during reversible actuation. As used herein, a "stable" optical response may, in certain examples, refer to a monotonic and continuous increase in optical power with an increase in applied voltage.

Figure 2:
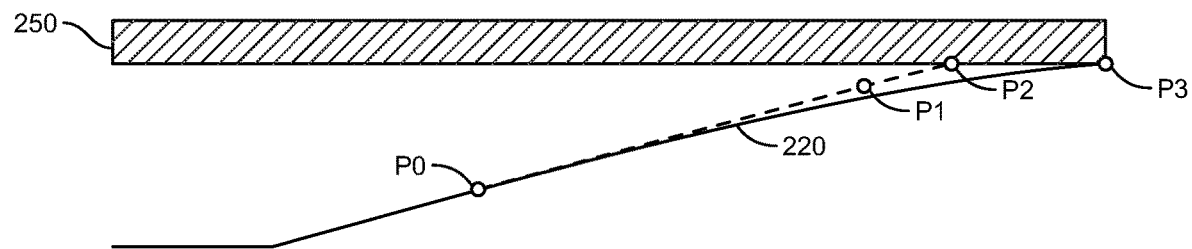
FIG. 2 is a cross-sectional schematic illustration of a varifocal electrostatic lens having a sloped support defined by a quadratic Bézier curve according to some embodiments.
Figure 3:
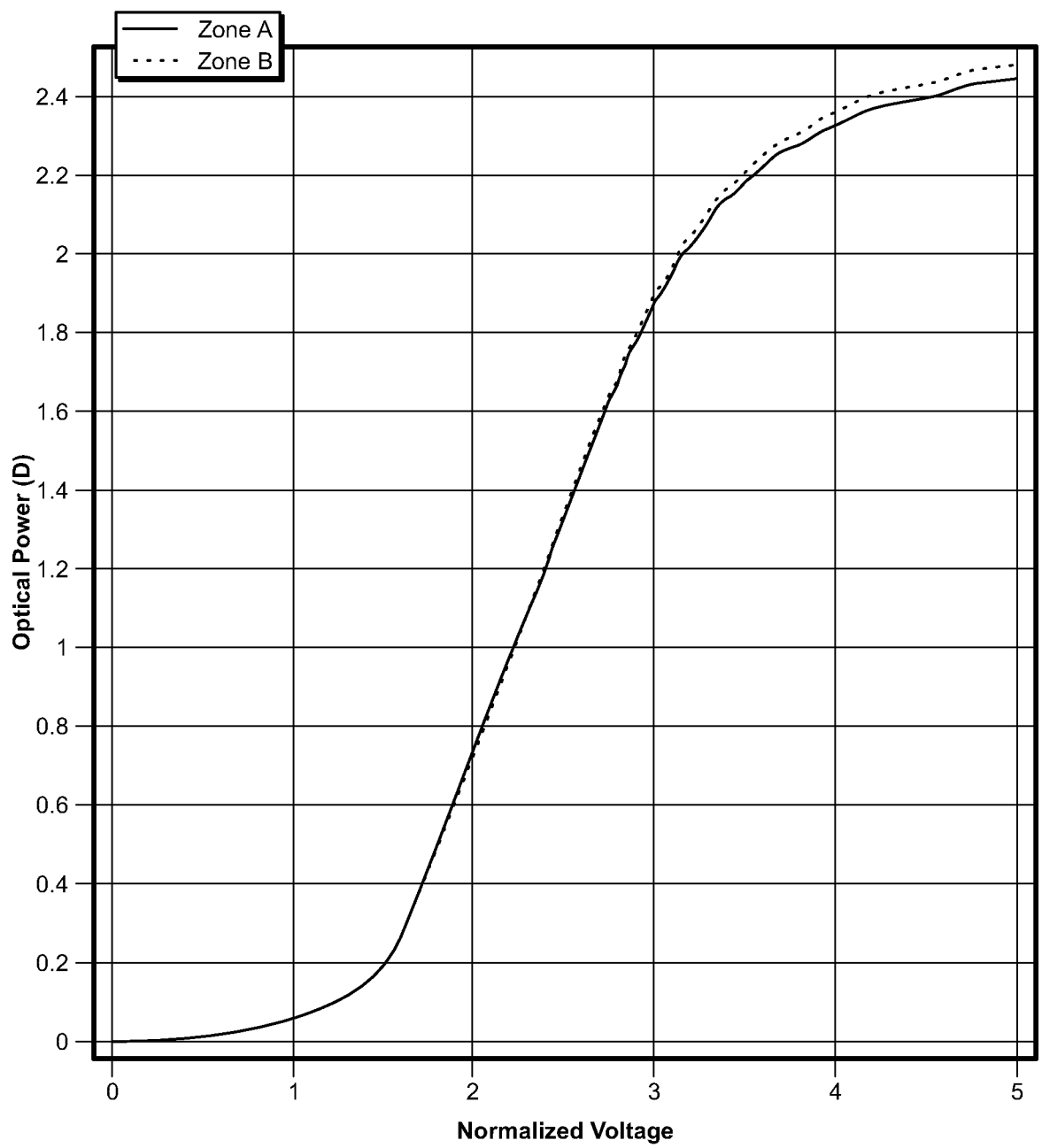
FIG. 3 shows the stable variation in optical power with applied voltage for the sloped support lens design shown in FIG. 2 averaged over two optical zones according to some embodiments.
Figure 4:
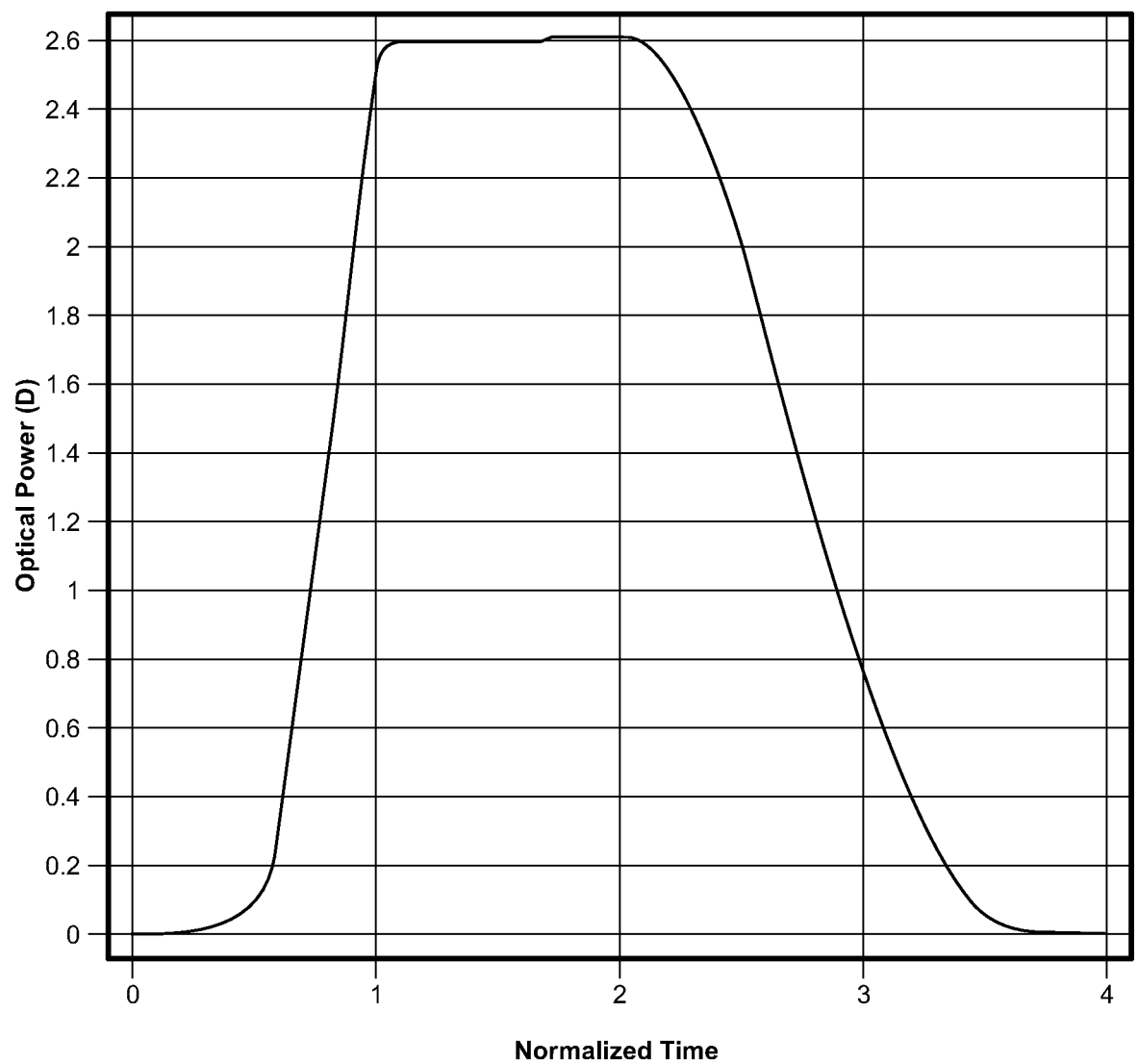
FIG. 4 shows the temporal response of the optical power for a varifocal electrostatic lens associated with the application and removal of an applied voltage according to certain embodiments.

By way of example, and with reference to FIG. 2, a sloped support 220 may be modeled as a quadratic Bézier curve, which enables a stable optical response during the zipping and unzipping of overlying membrane 250. A plot of optical power versus voltage for the sloped support design of FIG. 2 is shown in FIG. 3. Furthermore, with reference to FIG. 4, such a lens may also be stable when the applied voltage is removed. In the plot of FIG. 4, a voltage is applied over the normalized time range of 0 to 1, held constant over the normalized time range of >1 to 2, then gradually removed over the normalized time range of >2 to 3, and maintained at zero for normalized time >3.

Figure 5:
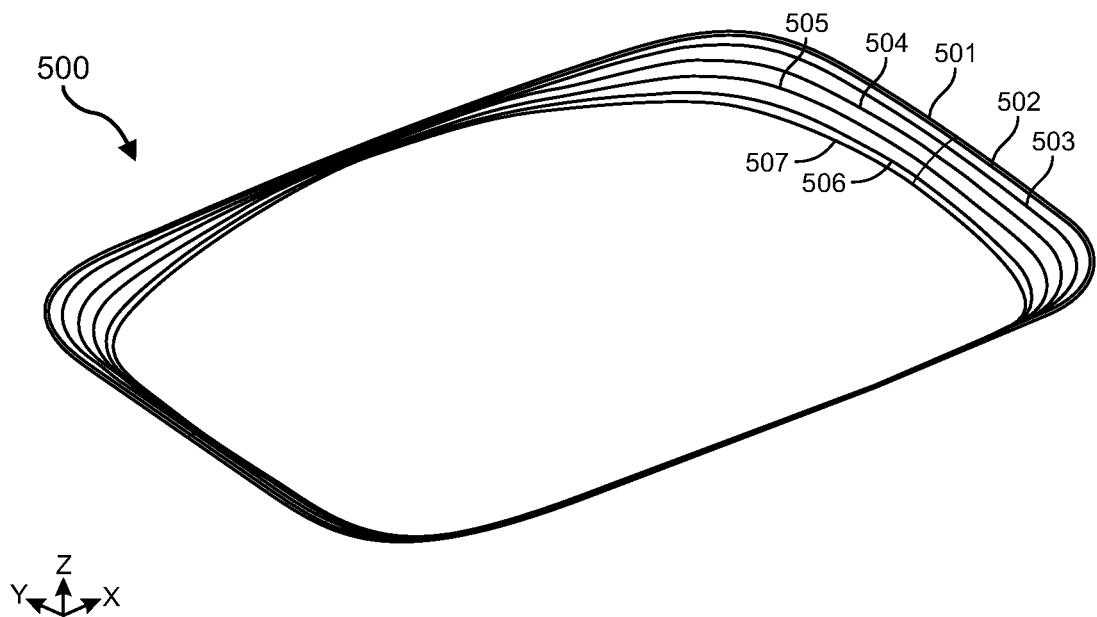
FIG. 5 shows a sloped support design for an exemplary 3D varifocal lens according to some embodiments.
Figure 6:
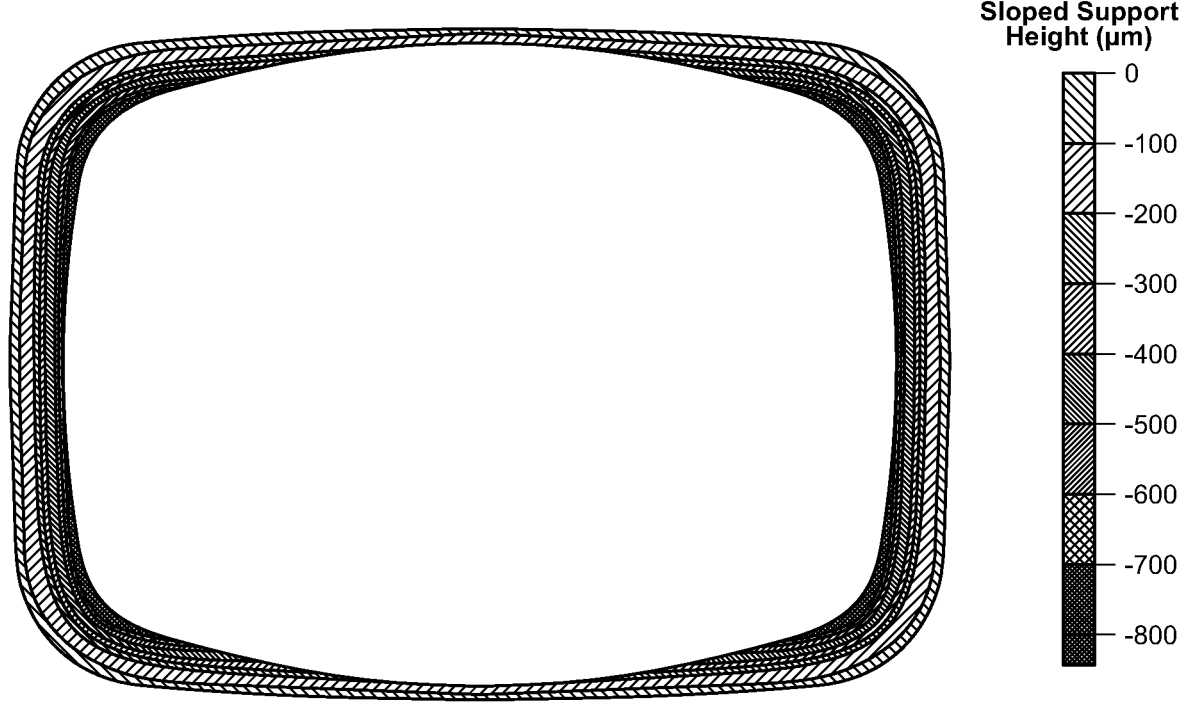
FIG. 6 shows the height of the sloped support for the exemplary 3D varifocal lens of FIG. 5 according to some embodiments.

A sloped support design for an exemplary 3D varifocal lens shape is shown in FIGS. 5 and 6. Referring to FIG. 5 and sloped support 500, circumferential contours 501-507 illustrate the edge of the zipped region of an overlying membrane for successive applied voltages. The profile shape is shown also in the top-down plan view of FIG. 6. According to certain embodiments, each contour line (also referred to herein as a design line) (e.g., contour lines 501-507) may correspond to the edge of the pulled down region of the membrane for a given applied voltage.

Figure 7:
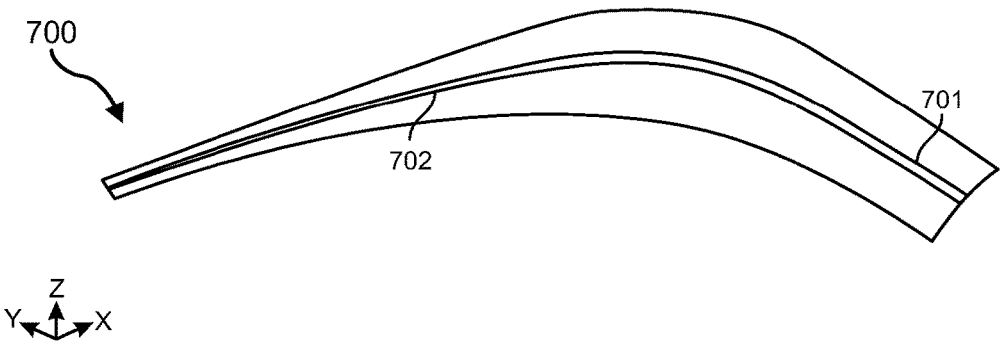
FIG. 7 illustrates a segment of a sloped support according to certain embodiments.
Figure 8:
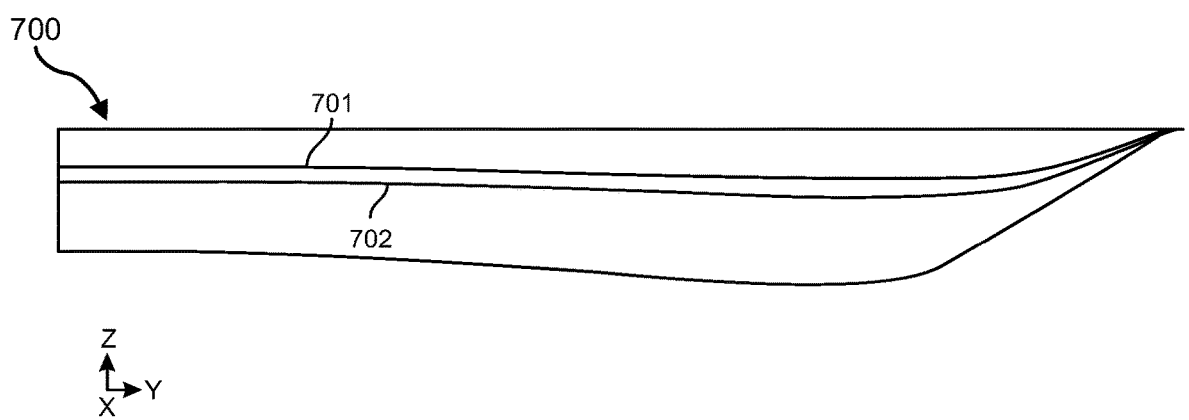
FIG. 8 shows a side view of the sloped support of FIG. 7 with contour lines having a variable z-coordinate according to certain embodiments.
Figure 9:
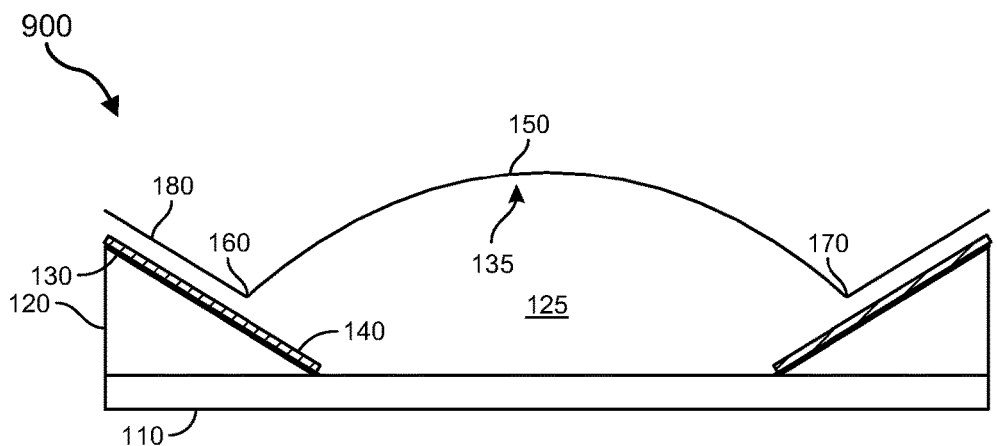
FIG. 9 is a schematic illustration showing the effects of applying a first voltage to the varifocal electrostatic lens of FIG. 1 according to some embodiments.

In the example of a non-circular lens, and with reference to FIGS. 7 and 8, sloped support 700 may include individual design lines 701, 702, etc. that may have a non-circular shape in the plane of the lens and, as shown in FIG. 8, a variable height in the direction (e.g., z-direction) normal to the lens. As will be appreciated, a sloped support may be designed so that a continuum of design lines may be accessed by applying a steadily varying DC voltage, or so that a discrete set of design lines may be accessed using a segmented electrode.

The sloped support may be elastic or inelastic and configured to accommodate bending of the membrane during actuation. In embodiments where bending of the membrane is non-negligible, an offset may be incorporated into the sloped support prior to the membrane engaging a first design line, e.g., during a zipping operation.

In certain embodiments, the one or more design lines (e.g., contour lines 501-507) may each correspond to a target lens shape. A target lens shape may be spherical or non-spherical, for example. In certain embodiments, the spacing between adjacent design lines may be configured so that a local gradient within the sloped support results in an equilibrium position for the overlying membrane when a particular voltage is applied. For a sloped support with negligible curvature, a constant "peel angle" may be realized between the sloped support and the membrane. A correction to the peel angle may be used when the sloped support surface has significant local curvature. During design, such a correction may be derived experimentally or empirically using calculations that represent the electrostatic forces on the lens. Additional corrections may be implemented based on the local shape and corresponding stress state of the membrane.

According to some embodiments, the sloped support design lines may have a height such that for each target lens shape, the volume of fluid enclosed by the lens is constant if the fluid is incompressible and there is no fluid exchange with a secondary fluid or with a secondary fluid volume. For a compressible fluid, on the other hand, the fluid volume (and pressure) may change to maintain the target lens shape.

According to some embodiments, by applying a voltage to one or more of the electrodes (i.e., the primary electrode and the secondary electrode), the resulting voltage gradient may create an electrostatic force that attracts transparent membrane 150 (including the attached secondary electrode) to the primary electrode 130. The electrostatic attraction and the effect of the attendant displacement on the lens shape is illustrated schematically in the electrostatic lens 900 of FIG. 9, where under the application of a first voltage (V1), transparent membrane 150 may be drawn to support 120 forming an attached region 180 with transition points 160, 170 that are each associated with a particular design line, inducing curvature in the transparent membrane 150. The electrostatically-induced displacement of the transparent membrane 150 and the attendant redistribution of fluid 125 between the substrate 110 and the transparent membrane 150 may induce a desired degree of curvature 135 in the membrane and a corresponding change in the focal power of the lens 900.

A liquid lens may include an optical liquid material, i.e., dielectric fluid, adapted to change its shape. According to certain embodiments, dielectric fluid 125 disposed between the substrate 110 and the membrane 150 may include siloxanes, phenylated compounds (e.g., polyphenylthioethers, polyphenylethers such as 3-, 4-, 5- and 6-ring polyphenyl ethers, phenylmethyl silicone fluids, and polyol esters), naphthalated compounds (e.g., naphthalenesulfonic acid and sodium alkyl naphthalene sulfonate), compounds containing halogens, phosphorus, or sulfur (e.g., sulfonate salts, arsenic trisulphide, diphenyl sulphide, carbon disulphide, and the like), polyimidothioethers (e.g., polyimidothioether, polyphenylthioethers, polyphenyl ethers, phenylated siloxane oils, naphthalated hydrocarbons, phenylated siloxane polymers, phenylated silicone fluids, and the like), nanoparticle suspensions (e.g., suspensions of anatase, rutile, ZnO, or $SiO_2$), and nanocomposite, high refractive index polymers (e.g., $TiO_2$ particles bound to a polyimidothioether), for example. The dielectric fluids disclosed herein may be characterized by a dielectric constant of at least approximately 5, e.g., at least 5, at least 10, at least 20, or at least 50, including ranges between any of the foregoing values.

Substrate 110 may include a transparent material, such as a polycarbonate, polyacrylate, or epoxy composition within an optically active area thereof. In certain embodiments, substrate 110 may include a peripheral non-transparent region. A non-transparent region of the substrate, e.g., a portion of the substrate located outside of optical aperture 112 under support 120, may include any suitable polymer, metal, or other mechanically stable material such as carbon fibers. According to various embodiments, the substrate 110 may include regions that are planar, concave, or convex.

The electrodes (i.e., the primary electrode and the secondary electrode) may include one or more electrically conductive materials, such as a metal, carbon nanotubes, graphene, oxidized graphene, fluorinated graphene, hydrogenated graphene, other graphene derivatives, carbon black, and transparent conductive oxides (TCOs, e.g., indium oxide, indium tin oxide (ITO), indium zinc oxide, zinc oxide (ZnO), tin oxide, indium gallium zinc oxide, etc.). Example metals suitable for forming the electrodes may include aluminum, silver, copper, gold, or platinum, as well as alloys thereof. The conductive material(s) may be in the form of nanoparticles, nanoflakes, nanowires, and other structured shapes. In some embodiments, the electrodes may have an electrical conductivity of approximately 50 S/cm to approximately $60 \times 10^4$ S/cm. The electrodes (i.e., the primary electrode and the secondary electrode) may be formed using any suitable deposition process, such as a sol gel process, screen printing, inkjet printing, vacuum sputtering, and the like.

According to some embodiments, the electrodes (e.g., the primary electrode and the secondary electrode) may have an average thickness of approximately 10 nm to approximately 10 µm, e.g., 10, 20, 50, 100, 200, 500, 1000, 2000, 5000, or 10000 nm, including ranges between any of the foregoing values.

In certain embodiments, a method of controlling the surface roughness of an electrode may include forming the electrode on a highly smooth surface, separating the electrode from the highly smooth surface to reveal an electrode smooth surface, inverting the electrode, and bonding the electrode to a transparent membrane with the electrode smooth surface exposed.

The electrodes (i.e., the primary electrode and/or the secondary electrode) in some embodiments may be configured to stretch elastically. The electrode(s) may be formed with a corrugated or ribbed structure that allows deformation without mechanical or electrical failure, e.g., during zipping or unzipping of the membrane. In some embodiments, an electrode may include a polymer composite including a low surface tension polymer matrix having conductive particles dispersed throughout the matrix. The polymer matrix may include silicones, acrylates, silicone-acrylates, and other elastomers. Example low surface tension polymers may include poly(tetrafluoroethylene), polyvinylidene fluoride, or poly(dimethyl siloxane). Example conductive particles may include metal nanoparticles, metal nanowires, graphene nanoparticles, graphene flakes, transparent conducting oxide nanoparticles, and the like. The electrodes may include a graphene composite. Further example electrodes may include poly(3,4-ethylenedioxythiophene) polystyrene sulfonate (PEDOT:PSS).

In some embodiments, as disclosed further herein, an electrode may be formed over the transparent membrane prior to, or after stretching the membrane. In certain embodiments, a curing step may be used to form the electrodes. The act of curing, which may include heating or exposure to actinic radiation (e.g., UV light, visible light, e-beam radiation, or x-rays) may be performed before or after stretching the membrane.

In some embodiments, the substrate and the overlying liquid lens may form a shape characterized as plano-convex, plano-concave, bi-convex, bi-concave, a negative meniscus, or a positive meniscus. The substrate, or the substrate in combination with the fluid and the overlying membrane, may form a prescription lens.

Figure 10:
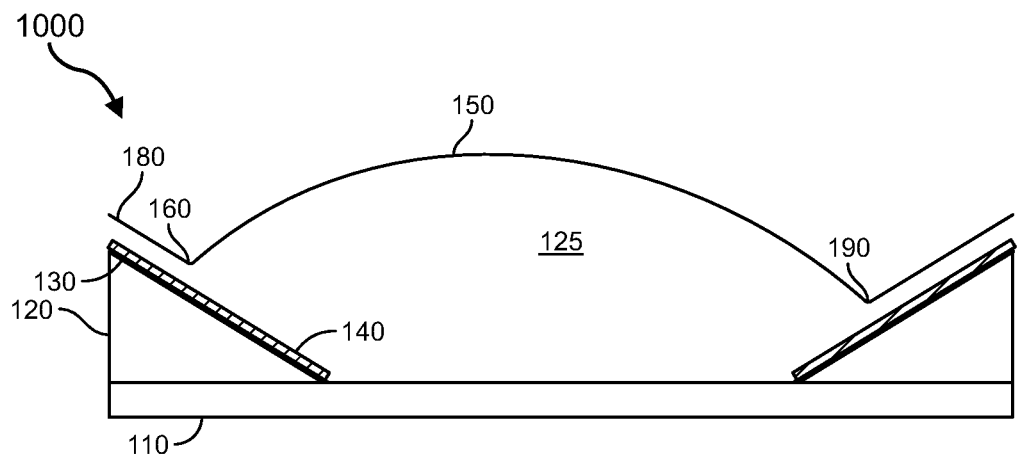
FIG. 10 is a schematic illustration showing the effects of stiction when applying a second voltage subsequent to and less than the first voltage according to some embodiments.

Referring to FIG. 10, shown is a further electrostatic lens 1000 where first voltage V1 is initially applied between the electrodes, and then a second voltage V2 (V2<V1) is applied. As shown schematically, due to stiction between the dielectric layer 140 and the transparent membrane 150 (or between the dielectric layer 140 and the secondary electrode), at least a portion of the transparent membrane 150 may relocate to a non-equilibrium transition point 190, resulting in an undesired curvature to lens 1000.

Figure 11:
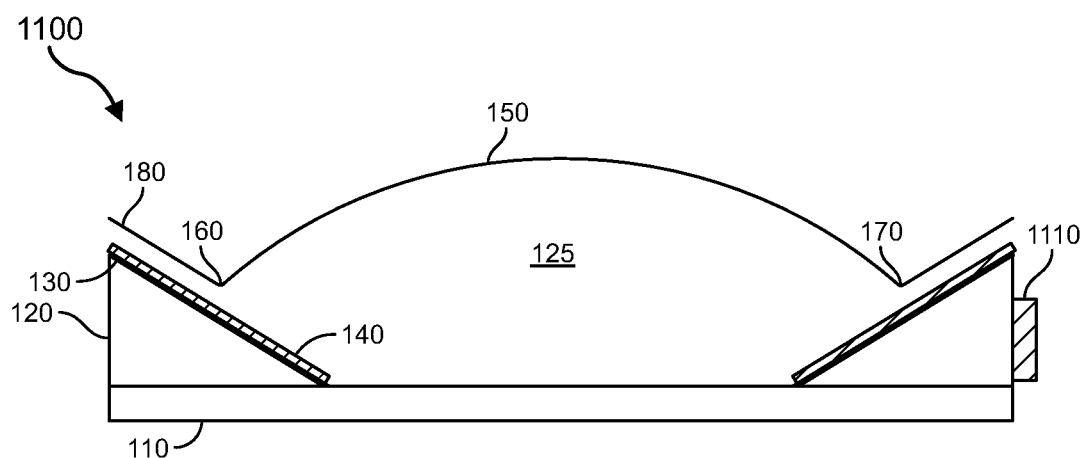
FIG. 11 is a schematic illustration showing the effects of both a mechanical force applied via a transducer and a second applied voltage on the varifocal electrostatic lens of FIG. 1 according to some embodiments.

According to some embodiments, the undesired effects of stiction may be mediated through the use of a transducer. As depicted in FIG. 11, transducer 1110 may be mounted to electrostatic lens 1100, e.g., to substrate 110, to sloped support 120 and/or to transparent membrane 150, and may apply a mechanical force during actuation that decreases the effects of stiction, resulting in the displacement of transparent membrane 150 (e.g., further to a change in applied voltage from V1 to V2) to equilibrium transition points 160, 170, which may each lie on a particular design line.

Transducer 1110 may include a piezoelectric device, for example, configured to apply one or more pulses to the transparent membrane 150. Suitable piezoelectric devices may include PZT or PMN-PT. Other suitable transducers may include $d_{33}$ or $d_{31}$ piezoelectrics such as oriented PVDF and PVDF-TrFE copolymers, electromagnetic transducers, including voice coils, and electrostatic devices, including electroactive or electrostrictive polymers, for example. In some embodiments, ultrasonication may be used to overcome surface tension, i.e., between the dielectric layer and an electrode, and facilitate unzipping of the actuator.

Figure 12:
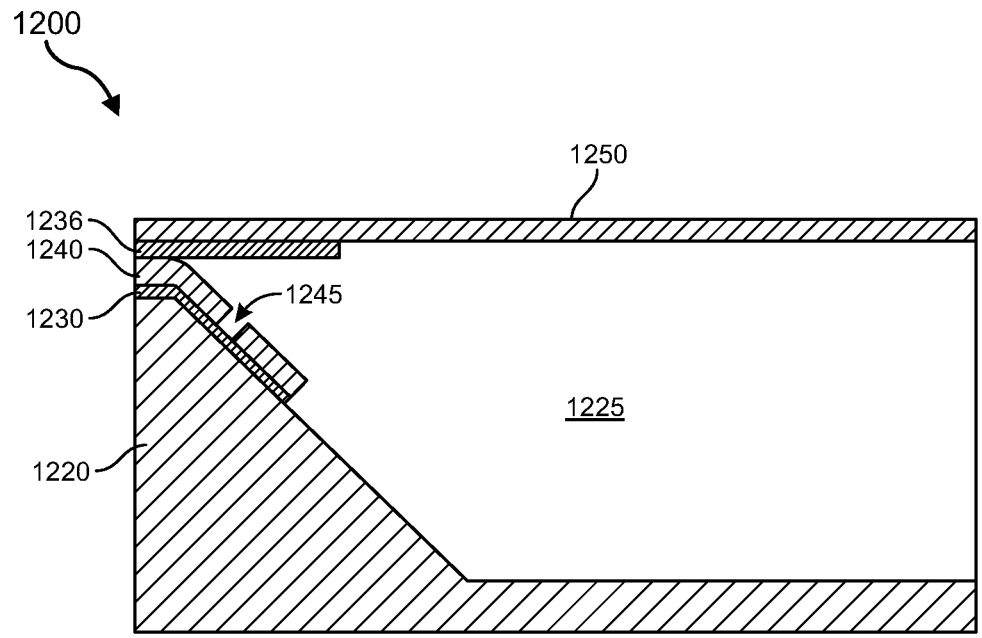
FIG. 12 shows a cross-sectional schematic view of a varifocal electrostatic lens having a pinhole defect in the dielectric layer according to certain embodiments.

An electrostatic lens 1200 having a dielectric layer 1240 disposed between a primary electrode 1230 attached to sloped support 1220 and a secondary electrode 1236 attached to a bottom surface of transparent membrane 1250 is shown in FIG. 12. In the illustrated embodiment, dielectric layer 1240 may include a pinhole 1245 that may be formed during fabrication of the dielectric layer 1240 or during operation of the lens 1200 where the defect may be formed, for example, by an electrical discharge. During operation of the electrostatic lens 1200, dielectric (lens) fluid 1225 within the liquid lens may at least partially fill pinhole 1245, which may increase the local electric breakdown strength of the dielectric layer 1240.

Figure 13:
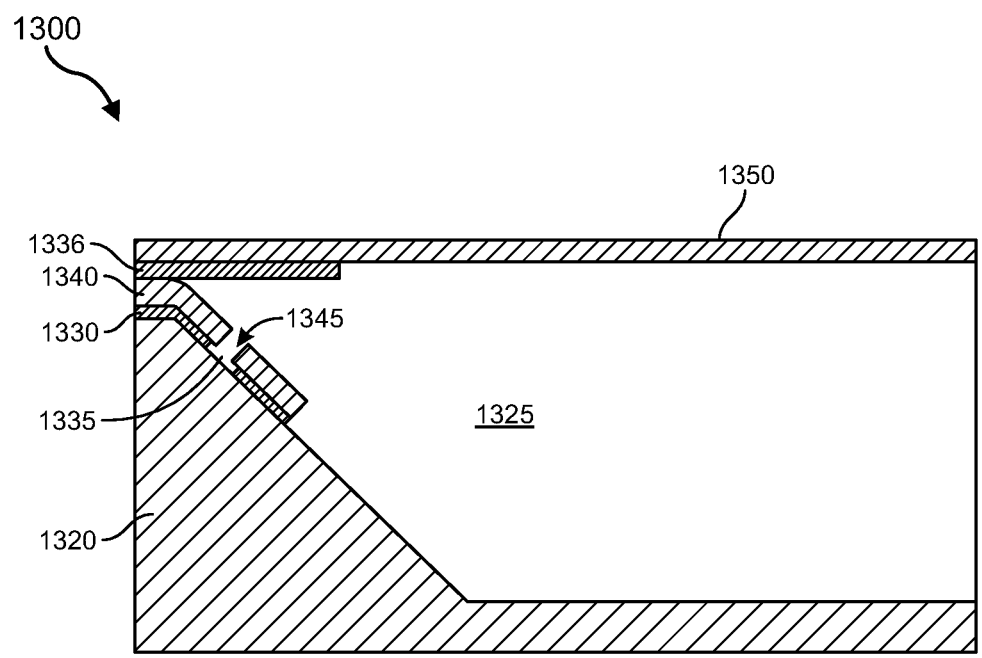
FIG. 13 shows a varifocal electrostatic lens having a self-healing electrode according to some embodiments.

A further electrostatic lens 1300 having a dielectric layer 1340 disposed between a primary electrode 1330 attached to sloped support 1320 and a secondary electrode 1336 attached to transparent membrane 1350 is shown in FIG. 13. Dielectric layer 1340 may include a pinhole 1345 that may be formed by an electric discharge created during operation of the electrostatic lens 1300. The pinhole 1345 in the dielectric layer 1340 may locally expose the underlying primary electrode 1330 resulting in a defect 1335 in the primary electrode 1330, which may cause the resistance of the electrode to increase due to one or more of crazing, melting, vaporization, etc.

In some embodiments, an electrode may be self-healing. That is, in some embodiments, an electrode such as the primary electrode 1330 may include a coating (not shown) or embedded material adapted to spontaneously heal cracks or other defects that develop during operation. In some embodiments, a defect 1335 in the primary electrode 1330 may back-fill with the dielectric (lens) fluid 1325, which may locally stabilize the primary electrode 1330.

According to some embodiments, the deformable membrane (e.g., transparent membrane 150, 1250, or 1350) may include any suitable deformable material, such as polyurethane, a fluoro-elastomer and/or a silicone elastomer.

Example deformable membranes may be optically transparent and may have a thickness of between approximately 50 micrometers and approximately 500 micrometers, e.g., 50, 100, 200, 300, 400, or 500 micrometers, including ranges between any of the foregoing values.

According to some embodiments, a barrier coating may be applied to the membrane to inhibit or prevent the permeation of fluid (e.g., a dielectric fluid such as a lens fluid) through the membrane. Example barrier coatings may include highly-crosslinked polyacrylates, fluorine-containing compositions, and poly(ethylene vinyl alcohol) compositions. In some embodiments, the membrane itself may exhibit intrinsic fluid barrier performance without a coating. Example membranes may have an ABA composite architecture, where each A layer includes a deformable material and the B layer includes a barrier coating.

Figure 14:
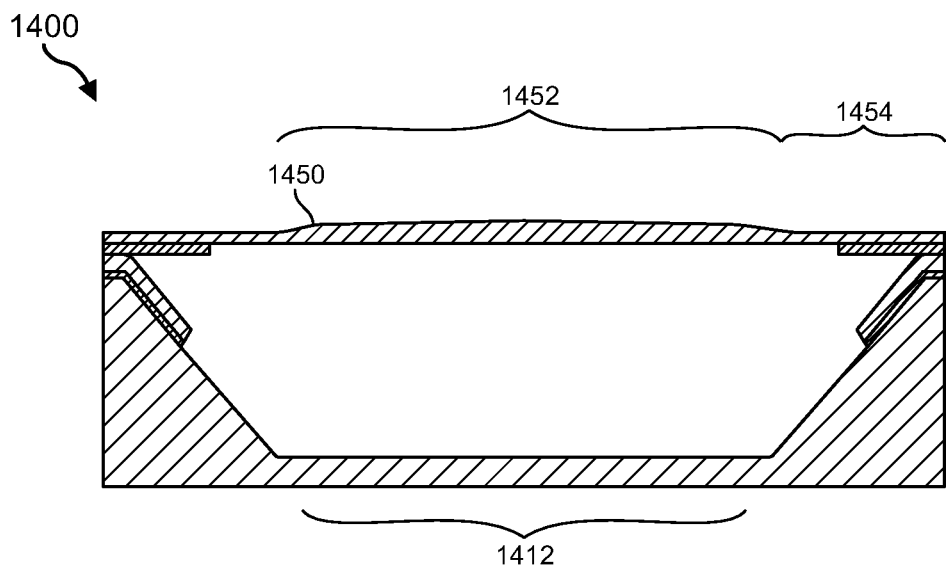
FIG. 14 depicts a varifocal electrostatic lens having a deformable membrane with a radially-dependent thickness according to various embodiments.

According to some embodiments, the thickness of the deformable membrane may be constant or variable. That is, in some embodiments, the membrane thickness may vary locally as illustrated in FIG. 14, where membrane 1450 of electrostatic lens 1400 may include a thicker region 1452 within optically active area 1412 and a thinner peripheral region 1454 outside of optically active area 1412. By providing a thicker membrane within the optically active area 1412, a lower driving voltage may be required, which may improve the mechanical performance, durability, and lifetime of the electrostatic lens 1400. In some embodiments, the membrane 1450 may have a comparatively higher modulus within the optically active area of the lens or, alternatively, within a region peripheral to the optically active area. For instance, a parabolically-shaped lens may be produced by deforming a membrane that is less stiff toward the center (and stiffer toward the edge).

In some embodiments, the deformable membrane (e.g., transparent membrane 150, 1250, 1350, or 1450) may be pre-stretched (pre-strained) up to approximately 100%, e.g., 1, 2, 5, 10, 20, 30, 40, 50, 60, 70, 80, 90, or 100%, including ranges between any of the foregoing values. In some embodiments, the line tension within the deformable membrane may be at least approximately 50 N/m, e.g., 50, 100, 150, 200, or 250 N/m or more, including ranges between any of the foregoing values. Higher line tension may decrease gravity sag and may favorably decrease incidences of sticking between an electrode and the dielectric layer during unzipping. That is, sufficient line tension within the membrane may promote debonding of the dielectric layer from an adjacent electrode.

In some embodiments, the membrane may be characterized by a spatially-dependent bending modulus and/or a spatially-dependent tensile modulus. That is, by way of example, the membrane may exhibit a low bending modulus along its periphery (where actuation takes place), and a low tensile modulus in the optically active area. By limiting the stretching of the membrane to the optically active center of the lens, less stringent requirements may be placed on the properties (e.g., compliance) of the electrode material deposited on the membrane, thus allowing a wider range of materials to be used.

In some embodiments, the membrane may be characterized by a spatially-dependent dielectric layer thickness or permittivity, which may be radially or azimuthally dependent. By changing the dielectric layer thickness as a function of position, the electric field and/or absolute voltage needed to drive the lens can be varied. Alternatively, the field concentration throughout the dielectric can be varied as a function of position. In some embodiments, one or more additional layers of material may be added to the membrane in the bending region to shift the neutral bending plane through the thickness of the membrane, which may shift the distribution of stresses through the bending region of the membrane.

According to some embodiments, the membrane may be pre-formed to exhibit zero strain in a non-planar configuration, such as a concave or a convex shape. That is, a zero-strain shape of the membrane may be planar, concave, or convex.

In an assembled varifocal electrostatic lens, the membrane may be bonded to the dielectric layer or to a portion of the sloped support. For instance, the membrane may be bonded along the sloped portion of the sloped support. In some cases, adhesives may be used to bond the membrane. Example adhesives include acrylic adhesives, urethane adhesives, and epoxy adhesives. In some cases, sonication welding, laser welding, or plasma flame welding may be used for bonding. Prior to bonding, a surface treatment may be used to change the surface energy of the bonding surface(s) and improve the bonding strength. The surface treatment may include a corona treatment, a plasma treatment, or the application of a primer layer (e.g. silane primer).

In some embodiments, to facilitate proper focal change and unzipping of the actuator, the surface tension of the dielectric layer may be less than approximately 35 dynes/cm and the surface tension of an adjacent electrode (i.e., the primary electrode and/or the secondary electrode) may be less than approximately 30 dynes/cm. The dielectric layer (e.g., dielectric layer 140, 1240, or 1340) may include any suitable dielectric polymer or metal oxide and may have a dielectric constant of at least approximately 2, e.g., approximately 2, approximately 3, approximately 5, approximately 7, approximately 10, approximately 20, approximately 30, approximately 50, approximately 70, approximately 100, or greater, including ranges between any of the foregoing values. Example dielectric materials may include fluorinated polymers, such as polyvinylidene fluoride, poly(vinylidene fluoride-co-hexafluoropropylene), or polytetrafluoroethylene; oxides such as silicon oxide, aluminum oxide, hafnium oxide, tantalum oxide, titanium oxide, zirconium oxide, strontium titanate, or barium titanate. Further example dielectric materials may include polysilsesquioxane, silicon nitride, etc. In some cases, the dielectric layer may further include embedded nanoparticles to increase the dielectric constant thereof. Example nanoparticles may include barium titanate, $TiO_2$, $CeO_2$, $BaSrTiO_3$, $PbZrTiO_3$, $PbLaZrTiO_3$, $PbMgNbO_3+PbTiO_3$, $Ta_2O_5$, $Al_2O_3$, and the like.

In some embodiments, a varifocal lens may include: a substrate, a primary electrode disposed over an inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a fluid between the membrane and the substrate, where a surface tension of the dielectric layer is less than approximately 35 dynes/cm and a surface tension of the secondary electrode is less than approximately 30 dynes/cm.

In further embodiments, a varifocal lens may include: a substrate, a primary electrode disposed over an inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a fluid between the membrane and the substrate, where the dielectric layer has a dielectric constant of at least approximately 2.

Further approaches to inhibit unintended bonding (e.g., stiction) between the dielectric layer and one or more of the electrodes may include forming one or more textured surfaces. A "textured surface," either randomly roughened or regularly patterned, may exhibit a lesser contact area with an adjacent surface than an untextured surface and hence require a lower separation force during unzipping.

Figure 15:
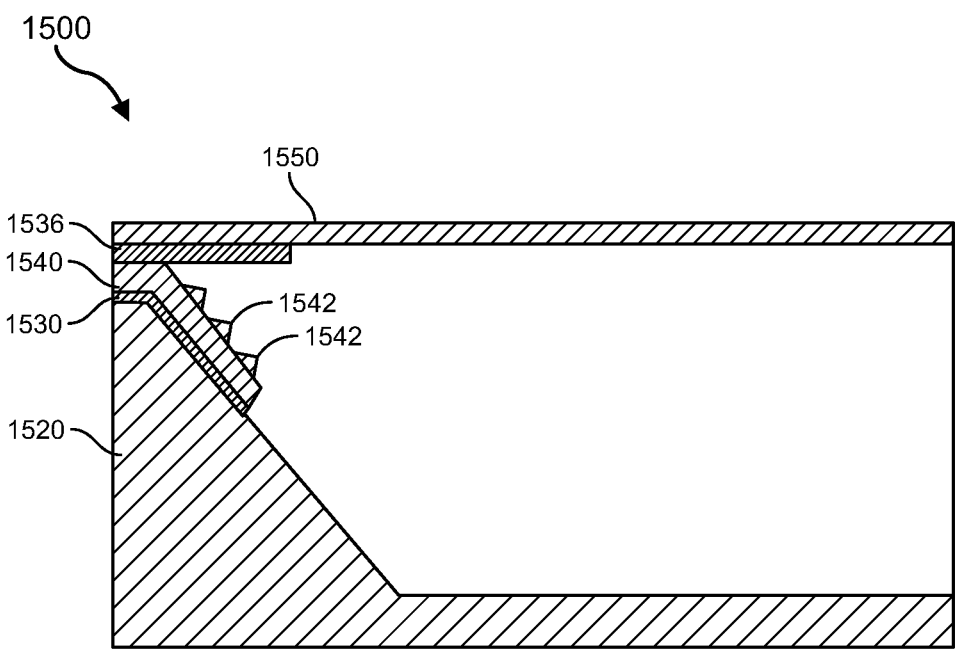
FIG. 15 shows a varifocal electrostatic lens having a textured dielectric layer according to some embodiments.

Referring to FIG. 15, an electrostatic lens 1500 may include a dielectric layer 1540 disposed between a primary electrode 1530 attached to sloped support 1520 and a secondary electrode 1536 attached to transparent membrane 1550. In the illustrated embodiment, a surface of the dielectric layer 1540 facing the secondary electrode 1536 may include a plurality of raised regions or bumps 1542 that facilitate unzipping along the interface between the secondary electrode 1536 and the dielectric layer 1540, e.g., by decreasing the contact area across the zipped interface. That is, in an actuated (zipped) state, secondary electrode 1536 may contact only extrema of bumps 1542.

Without wishing to be bound by theory, a surface adhesion energy parameter may be used to select materials and surface conditions to provide combinations of dielectric and conductive materials that de-bond (unzip) without applying an external force. According to certain embodiments, a surface adhesion energy (Θ) may be expressed as $$\Theta = \frac{E^*}{w}\sqrt{\frac{\sigma^3}{R}},$$

where $E^*=4/3[E/(1-v^2)]$ (E being the material deformability or elasticity of the two zipping interfaces and v being the Poisson's ratio of the material), where w is the specific surface energy of adhesion between the two zipping interfaces, and the surface roughness of the two zipping interfaces may be characterized by both σ, which is the standard deviation of an AFM surface scan for roughness, and R, which is the elastic sphere radius characterizing the contact area of an asperity.

Figure 16:
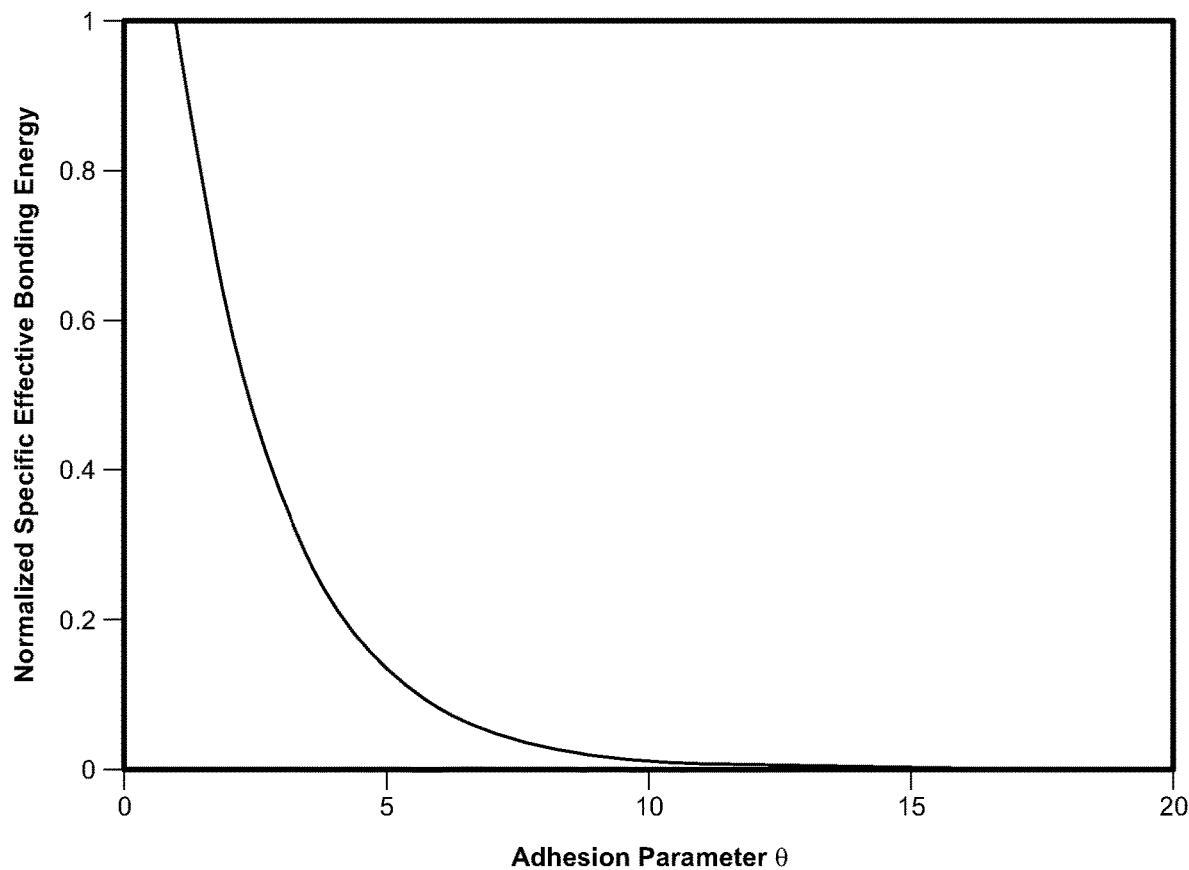
FIG. 16 is a plot of normalized specific effective bonding energy versus an adhesion parameter for the dielectric layer-electrode interface of an example varifocal electrostatic lens according to some embodiments.

An example of the functional form of the normalized specific effective bonding energy as a function of the adhesion parameter (θ) is shown in FIG. 16. To inhibit bonding (and facilitate de-bonding), according to certain embodiments, the adhesion parameter (θ) may be greater than approximately 1, e.g., greater than 1, greater than 2, greater than 5, greater than 10, or greater than 12, including ranges between any of the foregoing values.

According to some embodiments, texturing to decrease the surface adhesion energy may include various non-deterministic methods, such as wet chemical etching or dry etching (e.g., ion bombardment or plasma etching). According to further embodiments, texturing to decrease the surface adhesion energy may include various deterministic methods, including lithography and etching or self-assembly to create a pattern (e.g., raised regions 1542 as depicted in FIG. 15) over one or both of the two zipping surfaces. After patterning, an etch process may be used to selectively remove material and thereby decrease the effective contact area of one or both zipping surfaces. In some embodiments, deterministic and non-deterministic methods may be combined to tune the surface adhesion energy between the two zipping surfaces.

In some embodiments, a varifocal lens may include: a substrate, a primary electrode disposed over an inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a fluid between the membrane and the substrate, where the dielectric layer and the secondary electrode are configured to be reversibly brought into contact or the dielectric layer and the deformable membrane are configured to be reversibly brought into contact. The dielectric layer may include a textured surface that inhibits adhesion or stiction between the dielectric layer and the secondary electrode or between the dielectric layer and the membrane.

In accordance with various embodiments, the application of a voltage between the primary electrode and the secondary electrode may create an electrostatic attraction that initiates a zipping action and an accompanying deformation of the lens membrane. By discontinuing the applied voltage, the electrostatic force may be removed or reversed, which may initiate an unzipping action.

Figure 17:
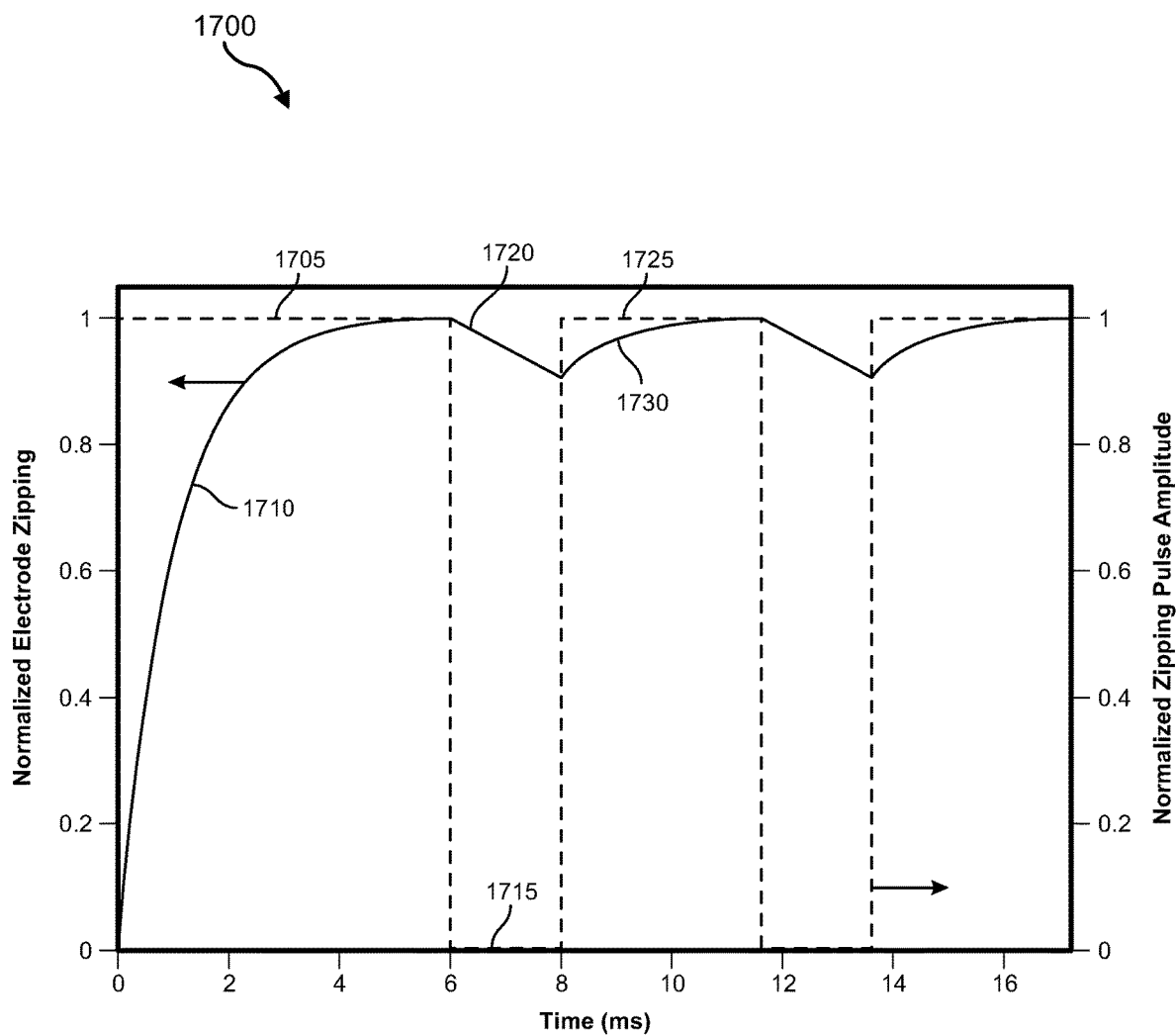
FIG. 17 is a plot showing the effect of a pulsed drive voltage on the operation of an example varifocal electrostatic lens according to various embodiments.

In some embodiments, the applied voltage may be a constant voltage or a periodically-applied voltage. For instance, a pulsed drive scheme may be implemented, which may beneficially decrease the overall required operational power, and also decrease parasitic effects otherwise associated with the long-term application of an applied field between the two electrodes. With reference to FIG. 17, an example method 1700 for operating a varifocal electrostatic lens may include applying an initial drive signal 1705 across the primary and secondary electrodes to initiate a zipping action 1710 that closes the gap between the electrode and the dielectric layer and actuates the liquid lens. Following the initial drive signal 1705, the drive signal may be decreased to a lesser amplitude 1715. During application of the drive signal 1715, the lens architecture may exhibit some level of unzipping 1720 with an associated time constant. Thereafter, a further drive signal 1725 may be applied, i.e., prior to the unzipping 1720 reaching an unacceptably low level. By applying drive signal 1725, the actuator may re-zip 1730. As illustrated, the foregoing pulsed process may be repeated to maintain a desired degree of deformation and a desired focal condition. In certain embodiments, the drive signal of lesser amplitude 1715 may range from approximately 0% to approximately 90% of the initial drive signal 1705, e.g., 0%, 1%, 2%, 5%, 10%, 20%, 30%, 40%, 50%, 60%, 70%, 80%, or 90%, including ranges between any of the foregoing values. A pulsed drive scheme may include a rectangularly-shaped pulse, as illustrated in FIG. 17, or a non-rectangularly-shaped pulse. According to some embodiments, a duty cycle of the pulse may be less than 100%.

Figure 18:
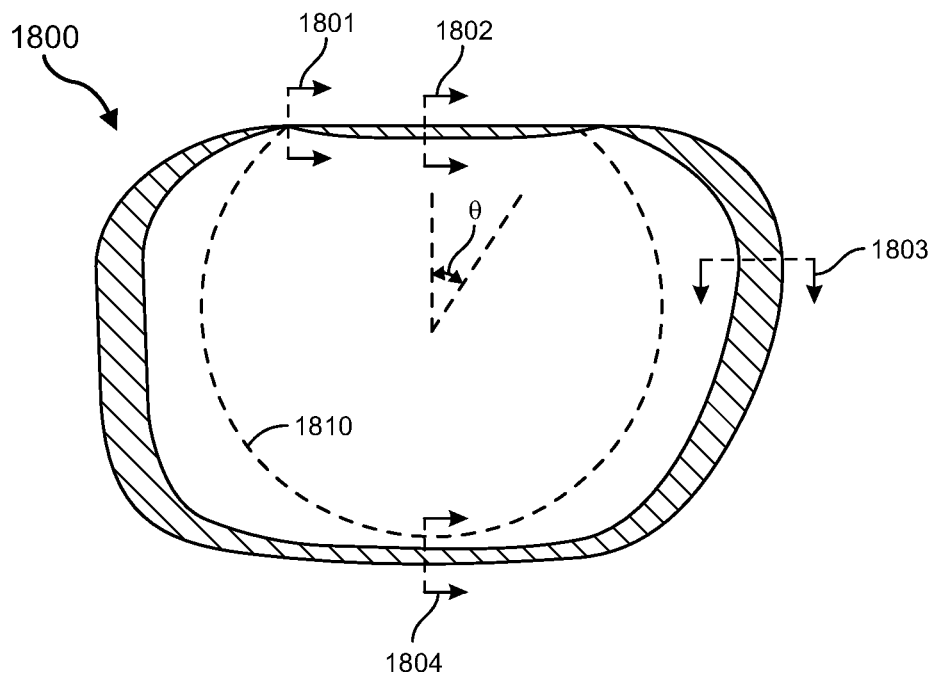
FIG. 18 is a plan view of an example varifocal electrostatic lens having a profiled electrode according to certain embodiments.

According to some embodiments, the profile of the primary electrode and/or the secondary electrode may be controlled to impact the performance of the varifocal electrostatic lens. Referring to FIG. 18, for example, the sectional profile of an electrode may be varied as a function of radial position around the border of a liquid lens 1800, such as a non-circular liquid lens. By locally changing the geometry, e.g., the slope, curvature, or generally the functional form and dimensions of the support to which the actuated membrane conforms, a desired membrane shape (e.g., spherical) can be realized. As will be appreciated, the lens shape may be circular or non-circular.

Figure 19:
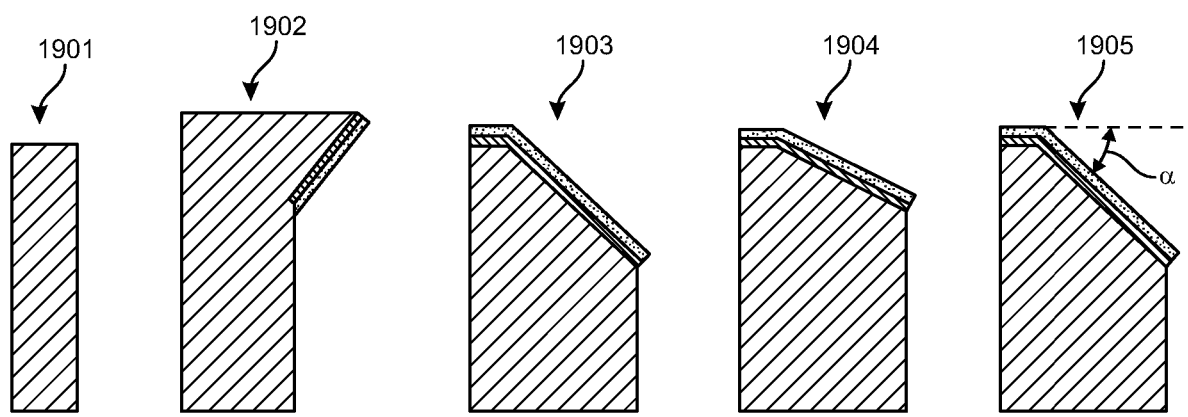
FIG. 19 shows exemplary cross-sectional views of various support profiles for the lens of FIG. 18 according to some embodiments.

Referring also to the support profile geometries shown in FIG. 19, in an example case where the circular eye-center

1810 of the lens 1800 intersects the membrane border 1801, such neutral points may not require actuation and the membrane may remain in a fixed position, i.e., by using an un-tapered support segment 1901. For segments where the eye-center border would otherwise be outside of the lens, e.g., border region 1802, the membrane may require an upward, vertical correction, which may be achieved by a cantilevered profile shape 1902 that pulls the membrane upward, or by using an actuator.

For a radial position where the edge of the lens is further from the lens center, e.g., border region 1803, the membrane edge may require larger actuation, which may correspond to a steeper support incline 1903. Alternatively, for a radial position where the edge of the lens may be closer to the lens center, e.g., border region 1804, the slope of the support surface 1904 may be less steep. In accordance with some embodiments, by controlling the electrode profile, the sphericity, cylindricity, and center position of the lens 1800 can be controlled. Generally, as shown in FIG. 19, the support surface profile 1905, and hence the electrode surface profile, may be configured at any angle ($\alpha$) from approximately −90° to approximately 90°. According to some embodiments, the support surface profile may be linear or non-linear.

Figure 20:
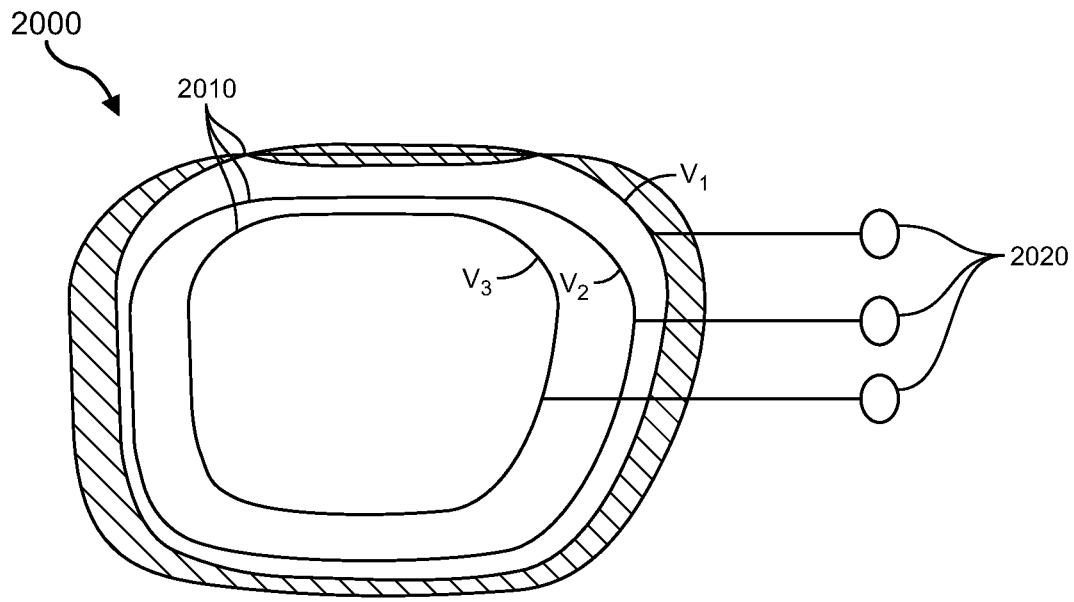
FIG. 20 is a plan view showing a varifocal electrostatic lens having segmented electrodes according to some embodiments.

According to some embodiments, a varifocal electrostatic lens may include segmented electrodes that may spatially localize the electrostatic effect. As shown for example in FIGS. 20 and 21, the electrodes may be partitioned into multiple elements. Referring to FIG. 20, electrostatic lens 2000 may include plural electrodes segmented into discreet elements 2010 each connected to an individual voltage port 2020. In certain embodiments, the maximum voltage needed for an intended change of optical power may be distributed across multiple voltage ports, thus providing a lower voltage level at each port compared to an electrostatic lens operable with a single port. In some embodiments, to decrease stiction of the membrane, a selected time and amplitude profile for each element 2010 can be used to achieve a desired membrane displacement while avoiding excess power consumption.

Figure 21:
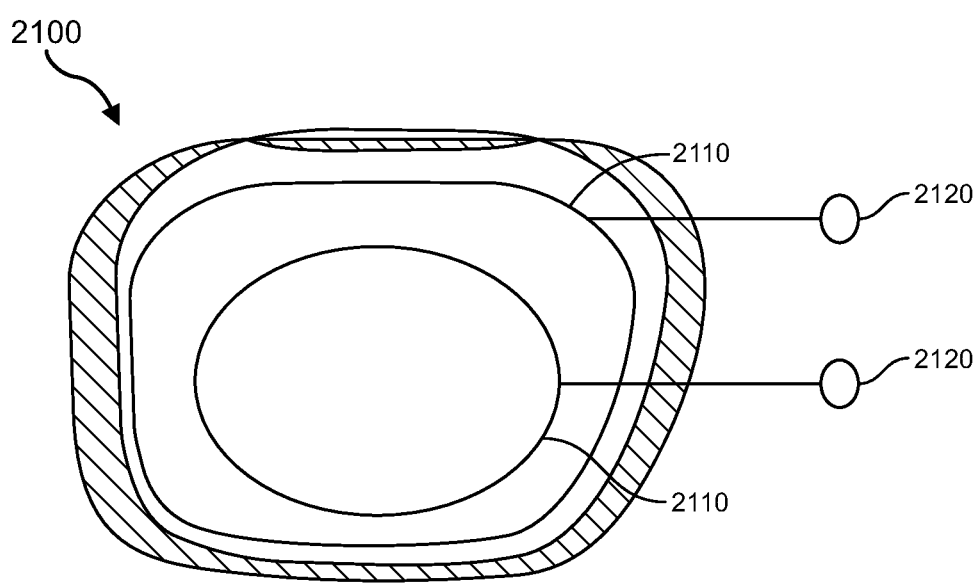
FIG. 21 is a plan view illustration showing a varifocal electrostatic lens having segmented electrodes according to further embodiments.

Referring to FIG. 21, in certain embodiments, the electrode segments 2110 for electrostatic lens 2100 may be arranged in a nonuniform layout having individual voltage ports 2120 to enable spherical or elliptical membrane displacement, e.g., at the center of the lens, while decreasing the total displacement at the periphery of the lens. Such a localized application of voltage may decrease power consumption, i.e., by applying a voltage only in regions where optical tuning is desired. In some embodiments, to reverse stiction, a repelling electrostatic force may be created by reversing the electrode bias.

Figure 22:
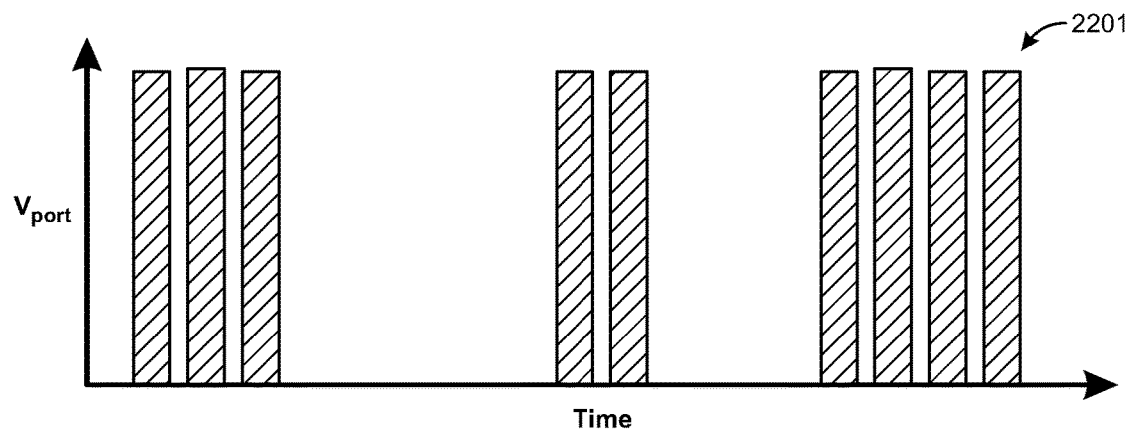
FIG. 22 is a schematic illustration of a constant voltage amplitude, variable frequency drive scheme for a varifocal electrostatic lens according to some embodiments.

In certain embodiments, as shown in FIG. 22, the electrodes may be independently biased with a voltage source modulated by a digital pulse width and/or duty-cycle to adjust the displacement of the membrane while supplying voltage pulses 2201 having a constant amplitude. The magnitude of the change in the optical power may be controlled by changing the duty cycle of the voltage pulses during the charging cycle and/or changing the pulse duration.

Figure 23:
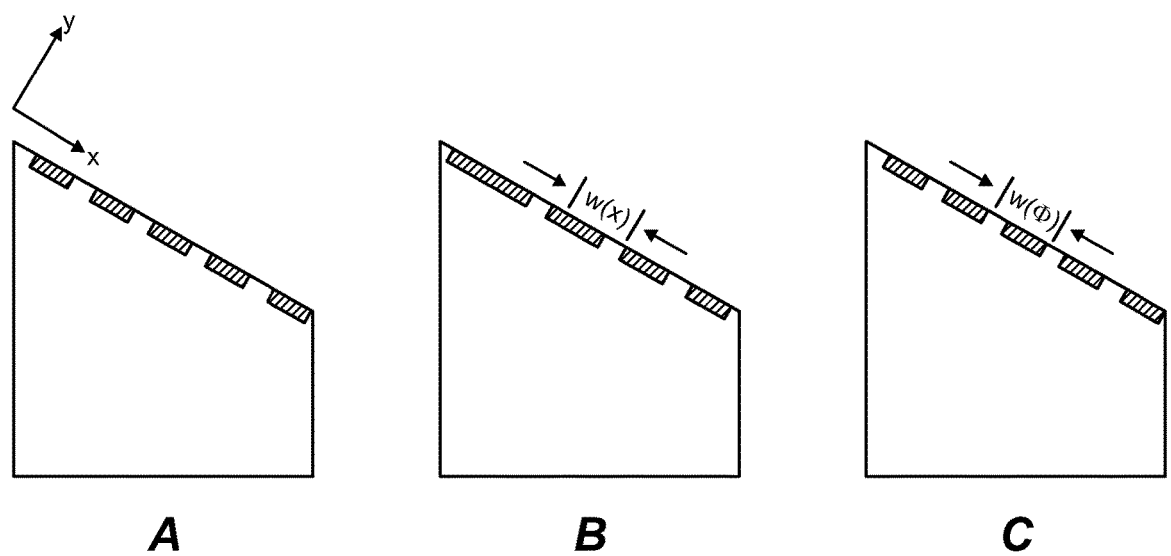
FIG. 23 illustrates cross-sectional views of example segmented electrode geometries, including electrodes formed over a sloped support and having (A) a constant width, (B) a radially-dependent width, and (C) a width that varies with azimuthal angle according to certain embodiments.

Referring to FIG. 23, shown are example cross-sections of segmented electrodes having an equal width (FIG. 23A) or an unequal width (FIG. 23B) along a radial direction. Furthermore, with reference to FIG. 23C, segmented electrodes may have a width (w) that is variable along the azimuthal angle ($\Phi$). As will be appreciated, according to some embodiments, the electrode profile and/or the actuator zipped length may vary along an azimuthal direction around a periphery of the lens.

In some embodiments, a varifocal lens may include: a substrate, a primary electrode disposed over an inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a fluid between the membrane and the substrate, where at least one of the electrodes is segmented, e.g., along a radial or azimuthal direction. According to some embodiments, plural electrode segments may be independently actuatable where, for example, the voltage amplitude and/or pulse duration may be controlled via connection to a respective voltage port. In some embodiments, electrical passivation may be located between adjacent segments to decrease leakage.

Figure 24:
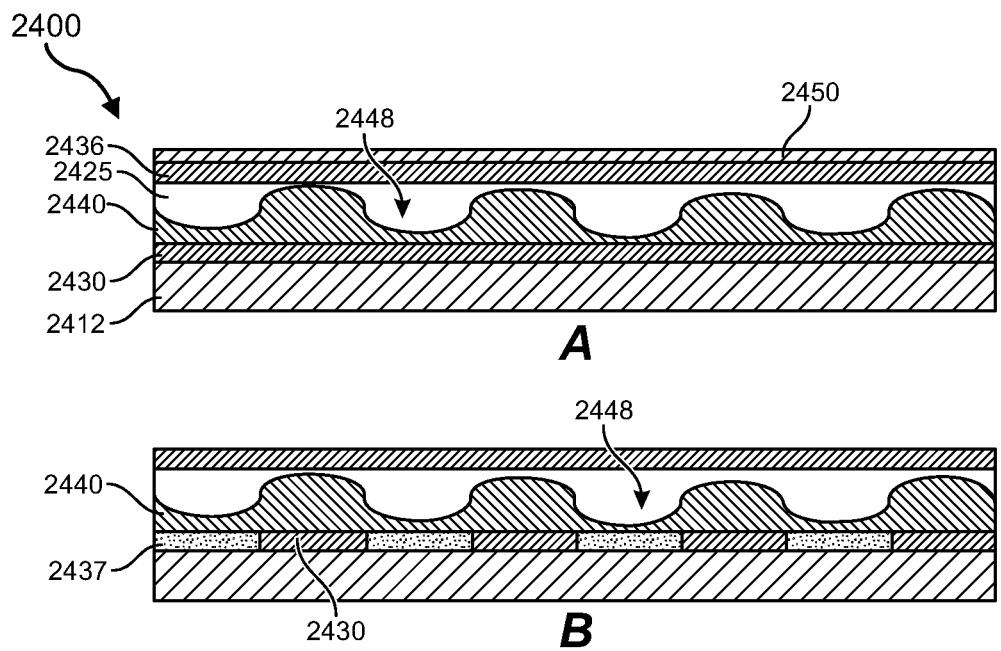
FIG. 24 shows the incorporation of fluid channels into the dielectric layer of a varifocal electrostatic lens architecture according to some embodiments.

According to some embodiments, the hydrodynamics associated with repeated zipping and unzipping of an electrostatic actuator may be improved by incorporating drainage channels into the varifocal electrostatic lens architecture. As depicted in FIG. 24, by decreasing the lens fluid's resistance to motion, faster actuation rates and hence faster focusing rates may be achieved. Referring to FIG. 24A, for example, varifocal electrostatic lens 2400 may include a support structure 2412, a primary electrode 2430 attached to and overlying the support structure 2412, and a dielectric layer 2440 overlying the primary electrode 2430. In an actuated state, a deformable membrane 2450 overlies the dielectric layer 2440, where a secondary electrode 2436 is affixed to a lower surface of the deformable membrane 2450 facing the dielectric layer 2440. A fluid 2425 may be disposed between the secondary electrode 2436 and the dielectric layer 2440. In the illustrated embodiment, drainage channels (e.g., recessed regions) 2448 fabricated in the dielectric layer 2440 may form gaps between a lower surface of the secondary electrode 2436 and an upper surface of the dielectric layer 2440 and provide faster fluid flow from the edge of the lens to the center of the lens upon actuation, as well as faster fluid flow from the center of the lens to the edge with a decrease or suspension of the actuation voltage.

As shown in FIG. 24B, in a related embodiment, regions of the primary electrode 2430 underlying drainage channels 2448 may be replaced with an insulating material 2437. The composition of the insulating material 2437 and the composition of the dielectric layer 2440 may be the same or different. In exemplary embodiments, drainage channels 2448 may extend radially or along an azimuthal direction and may have a constant or variable depth or width, e.g., a depth or width that varies along a radial direction.

In some embodiments, a varifocal lens may include: a substrate, a primary electrode disposed over an inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a fluid between the membrane and the substrate, where a surface of the dielectric layer facing the secondary electrode includes one or more fluid channels.

According to some embodiments, the hydrodynamics associated with repeated zipping/unzipping may be improved by using a fluid with shear thinning properties.

During zipping/unzipping, a transducer may be active and decrease the viscosity of the fluid and, as such, the fluid transients that may otherwise limit the switching speed of the liquid lens. During steady state operation of the liquid lens, on the other hand, the transducer may be turned off, resulting in a higher viscosity fluid that can maintain the lens shape while exerting less pressure on the membrane and the substrate. This operational scheme may allow for lower voltages to be used during steady state. An example fluid would behave as a Bingham fluid, exhibiting zero shear yield stress.

According to some embodiments, the interface between the dielectric layer and the secondary electrode (or between the dielectric layer and the deformable membrane) may include an omniphobic (e.g., liquid-phobic) material layer such as a liquid-infused porous material. Example porous solids may include functionalized porous/textured materials, e.g., periodically-ordered and randomly-configured materials, such as regular arrays of nanoscale posts functionalized with a low-surface energy polyfluoroalkyl silane, or a random network of polytetrafluoroethylene nanofibers distributed throughout a bulk substrate, respectively. Suitable lubricating liquids may include low surface tension perfluorinated compounds.

Such an interfacial layer may provide lubrication for faster fluid transients and may also inhibit stiction during unzipping. In certain embodiments, a lubrication layer may include a dielectric material and may replace the dielectric layer. In the event of local electrical breakdown, a dielectric lubrication layer may self-heal and prevent failure of the actuator. Such a lubrication layer may include a low modulus material that deforms further upon zipping, while the fluid stays within pores of the substrate. Alternatively, the lubrication layer may include a high modulus material that withstands high pressures.

According to some embodiments, a hydrophilic coating 2641 (FIG. 26) and a hydrophobic coating 2642 (FIG. 26) may be applied to the secondary electrode and a surface of the dielectric layer, respectively, to decrease or avoid stiction therebetween. Example hydrophilic coatings may include poly(vinyl alcohol), polyvinylpyrrolidone, poly(ethylene glycol)-based coatings and/or treatment with silane. Example hydrophobic coatings may include fluorine containing compounds, silicones, alkanes, and the like.

According to some embodiments, the functionality of an electrostatic actuator may be improved by providing a gap between the primary electrode and the secondary electrode. In such embodiments, an array of spacers may be formed over at least one of the electrodes where, in an actuated state, the spacers may operate to maintain physical separation between the electrode pair. In some embodiments, the gap may include an air gap. In further embodiments, the gap may be at least partially filled with a dielectric fluid. By maintaining a gap between the electrodes, i.e., in an actuated state, higher voltage operation may be achieved, and the hydrodynamics associated with repeated zipping and unzipping may be improved.

The spacers, which may be in the form of pillars or ribs, may include any suitable elastomeric material including, but not limited to, rubbers, siloxanes, silicones, alkanes, acrylics, and the like, as well as combinations thereof. Further suitable elastomeric polymers may include halogenated polymers, e.g., fluorinated and/or chlorinated polymers.

Figure 25:
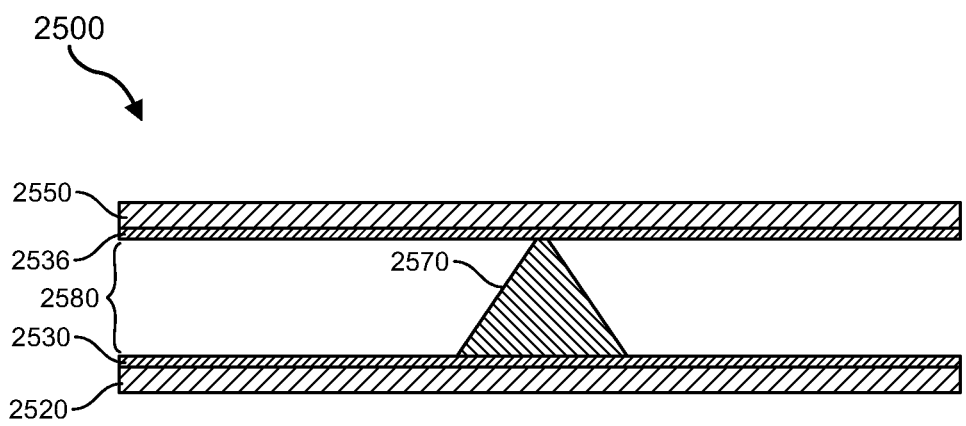
FIG. 25 is a cross-sectional schematic view of an elastic spacer disposed between and separating a pair of conductive electrodes of a varifocal electrostatic lens according to some embodiments.

An example electrostatic actuator having an elastic spacer disposed between the primary electrode and the secondary electrode is shown schematically in FIG. 25. Electrostatic actuator 2500 may include a primary electrode 2530 disposed over a primary substrate or support 2520. Facing the primary electrode 2530, a secondary electrode 2536 may be disposed over a bottom surface of a secondary substrate 2550. Secondary substrate 2550 may include a deformable, transparent membrane as disclosed herein. In the illustrated embodiment, an elastic spacer 2570 may be formed directly over the primary electrode 2530 and may contact the secondary electrode 2536 defining a gap 2580, e.g., an air gap, between the electrodes 2530, 2536. Elastic spacer 2570 may be shaped as a pillar or a rib, i.e., the spacer 2570 may extend in one lateral dimension more than in an orthogonal lateral dimension.

Figure 26:
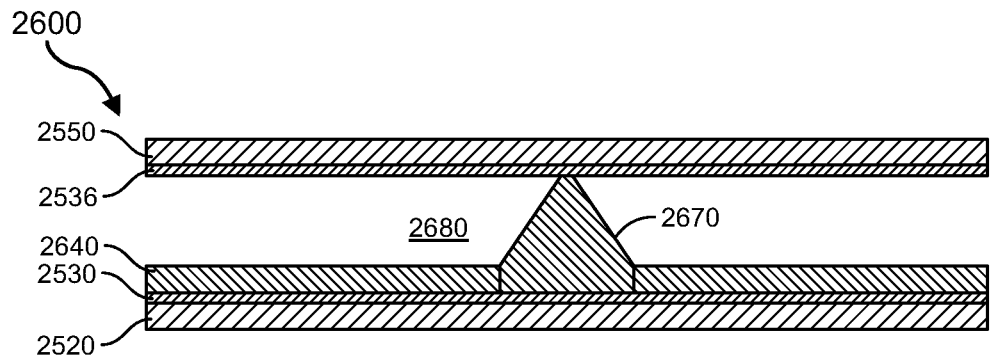
FIG. 26 shows a dielectric layer overlying a primary electrode and an elastic spacer disposed between and separating the primary electrode from a secondary electrode according to various embodiments.

Referring to FIG. 26, electrostatic actuator 2600 may include a primary electrode 2530 disposed over a primary substrate or support 2520. Facing the primary electrode 2530, a secondary electrode 2536 may be disposed over a bottom surface of a secondary substrate 2550, such as a deformable, transparent membrane as disclosed herein. A dielectric layer 2640 may be formed over the primary electrode 2530, i.e., directly over the primary electrode 2530, and an elastic spacer 2670 may be formed directly over the primary electrode 2530 adjacent to the dielectric layer 2640. In an actuated state, the elastic spacer 2670 may contact the secondary electrode 2536 to define a gap 2680 between the electrodes 2530, 2536, i.e., a gap between an upper surface of the dielectric layer 2640 and a lower surface of the secondary electrode 2536.

In certain embodiments, the thickness of the dielectric layer 2640 may be constant. In certain embodiments, the thickness of the dielectric layer 2640 may vary as a function of position over the primary electrode 2530. For instance, the dielectric layer may be thinner adjacent to the elastic spacer 2670 and thicker in regions spaced away from the elastic spacer 2670.

Figure 27:
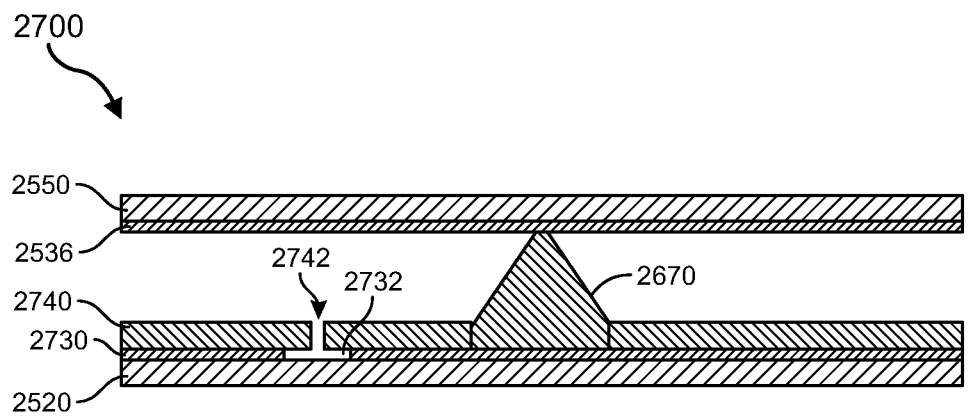
FIG. 27 illustrates the formation of a defect extending through the dielectric layer of FIG. 26 and into the primary electrode according to some embodiments.

As will be appreciated, during formation and/or operation of the electrostatic actuator 2600, a defect may form in dielectric layer 2640, such as from an electric discharge that may occur with the application of a voltage across the actuator. Turning to FIG. 27, an electrostatic actuator 2700 may include a dielectric layer 2740 having a defect 2742 extending through the dielectric layer 2740. In some embodiments, the defect 2742 in dielectric layer 2740 may extend into underlying primary electrode 2730 forming defect 2732 in the electrode.

Figure 28:
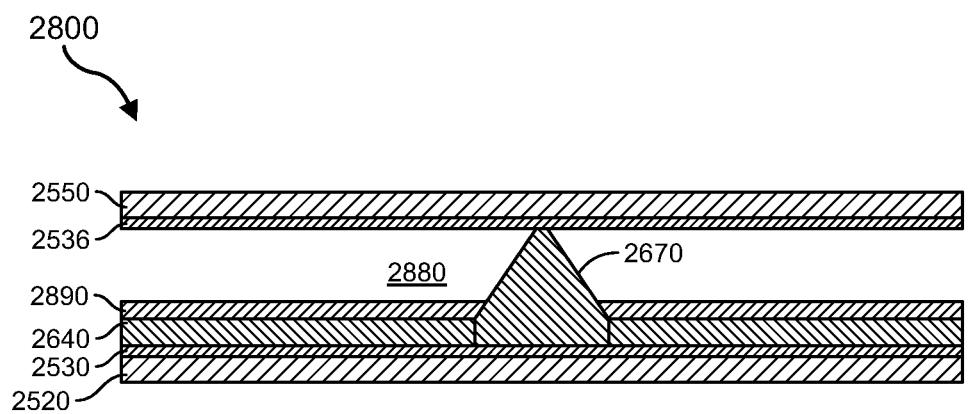
FIG. 28 shows the incorporation of a dielectric fluid over the dielectric layer of the structure of FIG. 26 according to some embodiments.

Referring now to FIG. 28, an electrostatic actuator 2800 may include a primary electrode 2530 disposed over a primary substrate or support 2520. Facing the primary electrode 2530, a secondary electrode 2536 may be disposed over a bottom surface of a secondary substrate 2550, such as a deformable, transparent membrane as disclosed herein. A dielectric layer 2640 may be formed over the primary electrode 2530, and a layer of dielectric fluid 2890 may be disposed over the dielectric layer 2640. An elastic spacer 2670 may be formed directly over the primary electrode 2530 adjacent to the dielectric layer 2640 and the layer of dielectric fluid 2890 defining a gap 2880 between a top surface of the dielectric fluid 2890 and a bottom surface of the secondary electrode 2536. In some embodiments, the layer of dielectric fluid 2890 may include an organic or organo-siloxane material such as a dielectric oil.

Figure 29:
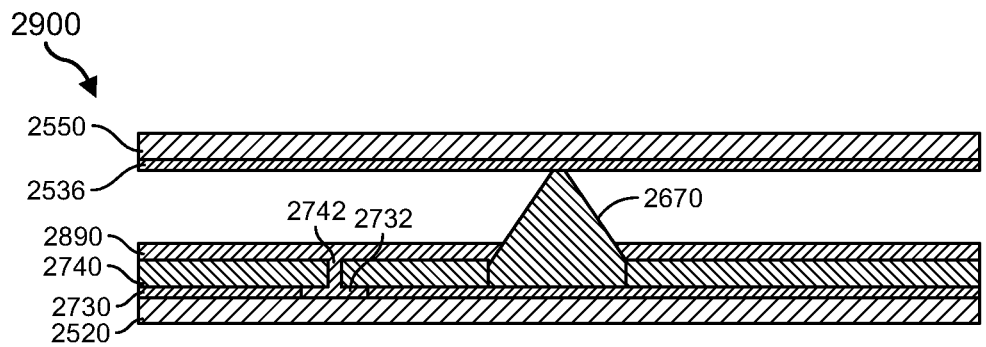
FIG. 29 depicts the flow of the dielectric fluid into the defect extending through the dielectric layer and into the primary electrode according to certain embodiments.

Referring to FIG. 29, in the example of an electrostatic actuator 2900 having a defective dielectric layer 2740 and, in some embodiments, a defective primary electrode 2730 underlying the dielectric layer 2740, the dielectric fluid 2890 may flow into and at least partially fill defects 2742 and 2732 in the dielectric layer 2740 and the primary electrode 2730, respectively.

Figure 30:
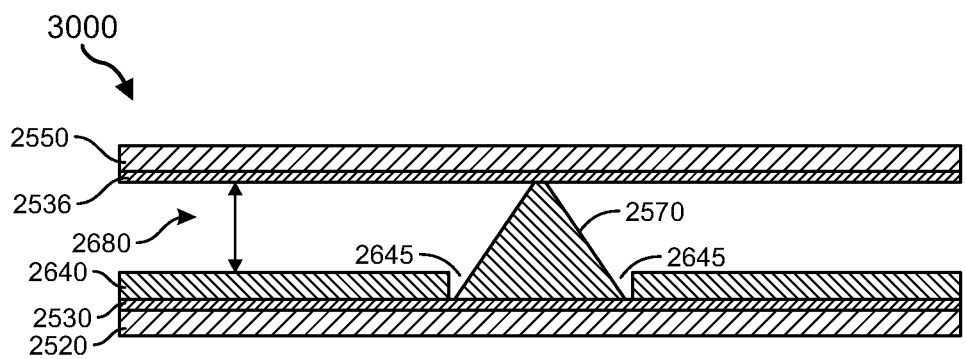
FIG. 30 shows a dielectric layer overlying a primary electrode and spaced away from an elastic spacer disposed between and separating the primary electrode from a secondary electrode according to various embodiments.

A further electrostatic actuator is illustrated in FIG. 30. Electrostatic actuator 3000 may include a primary electrode 2530 disposed over a primary substrate or support 2520. Facing the primary electrode 2530, a secondary electrode 2536 may be disposed over a bottom surface of a secondary substrate 2550, such as a deformable and transparent membrane. A dielectric layer 2640 may be formed over (e.g., directly over) the primary electrode 2530, and an elastic spacer 2570 may be formed over (e.g., directly over) the primary electrode 2530 adjacent to the dielectric layer 2640. The elastic spacer 2570 may contact the secondary electrode 2536 to define gap 2680 between the electrodes 2530, 2536, i.e., between an upper surface of the dielectric layer 2640 and a lower surface of the secondary electrode 2536. In the instant embodiment, the dielectric layer 2640 may be spaced away from the elastic spacer 2570 defining lateral gaps 2645, which may allow lateral expansion of the spacer 2570 during operation.

In certain embodiments, a ratio of the distance between adjacent spacers to a distance between the electrodes may be at least approximately 1, e.g., 1, 2, 3, 4, or 5, including ranges between any of the foregoing values.

Figure 31:
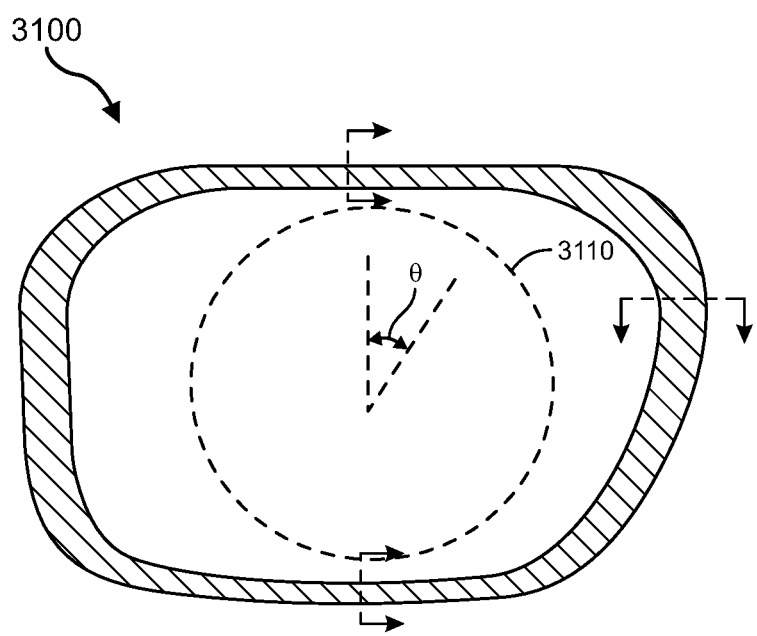
FIG. 31 is a plan view of an example varifocal electrostatic lens having a profiled electrode according to certain embodiments.
Figure 32:
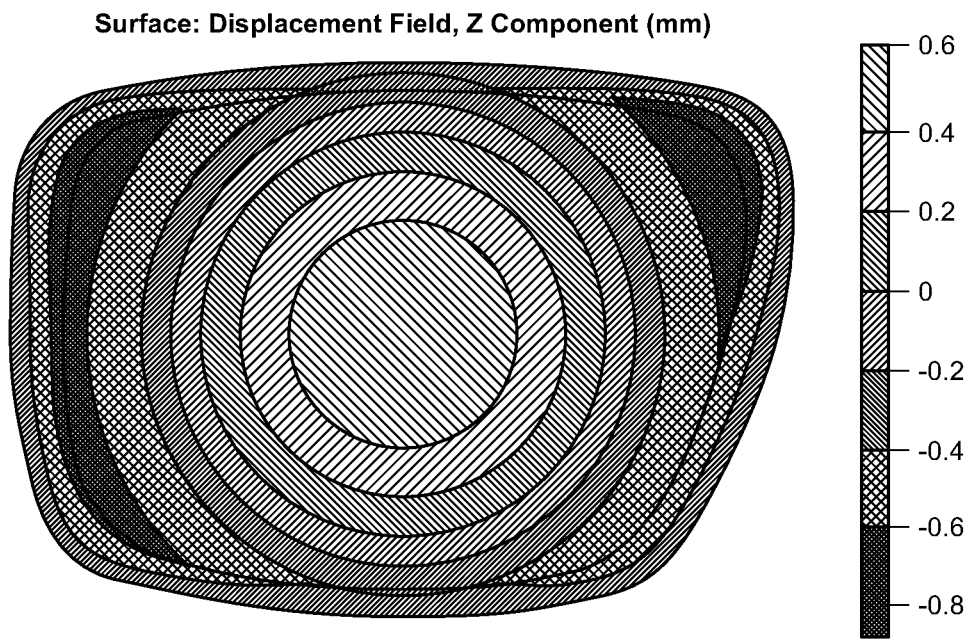
FIG. 32 is a contour map showing the displacement field for an example varifocal electrostatic lens according to some embodiments.
Figure 33:
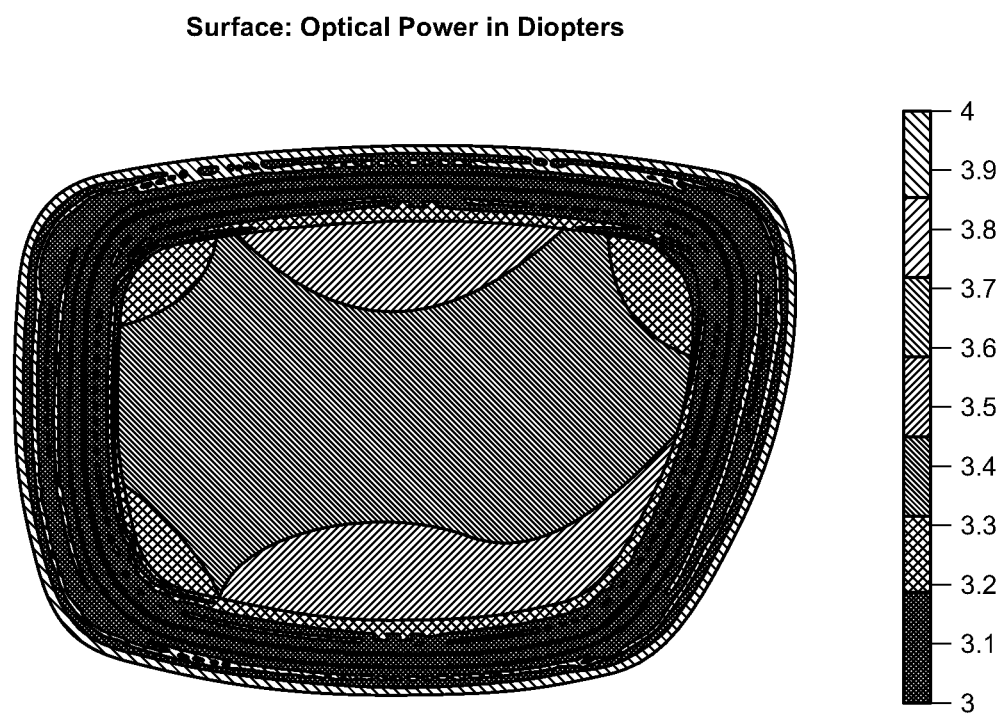
FIG. 33 is a contour map showing the surface optical power for an example varifocal electrostatic lens according to some embodiments.
Figure 34:
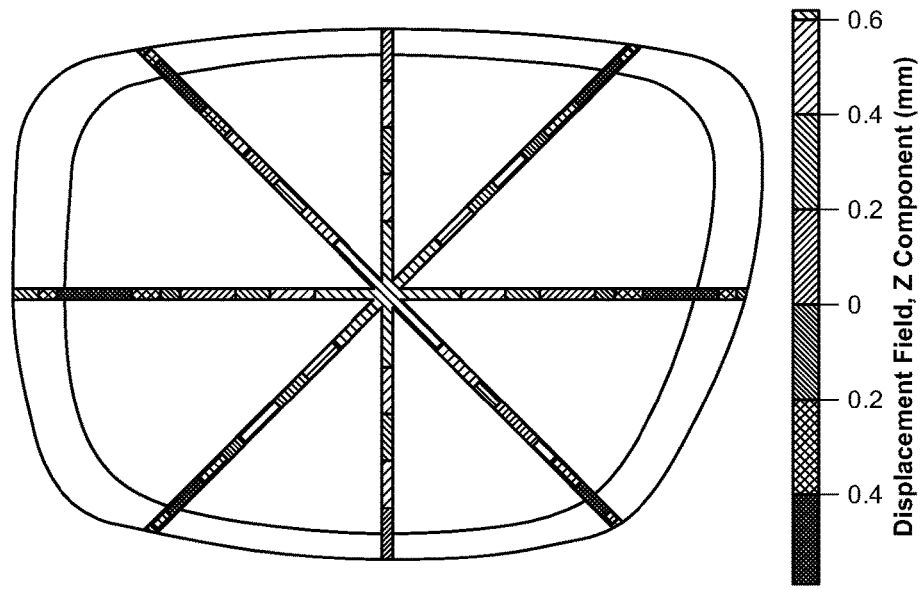
FIG. 34 illustrates sectional profiles of an example varifocal lens showing variation in the electrode profile angle and membrane displacement as a function of position according to certain embodiments.
Figure 35:
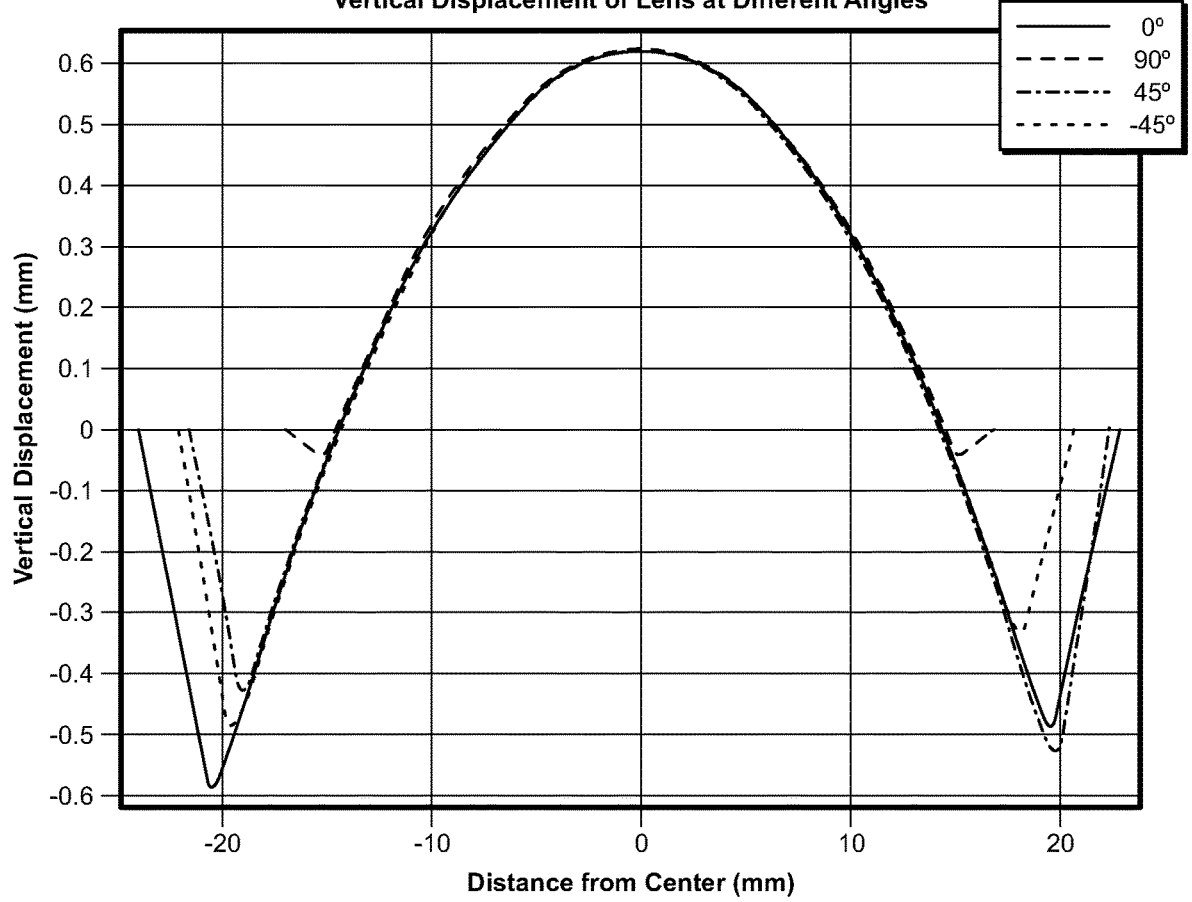
FIG. 35 is a plot of vertical displacement versus location for the varifocal electrostatic lens of FIG. 34 according to some embodiments.

In accordance with further embodiments, FIGS. 31-35 and the description that follows relate to various displacement profiles for example varifocal electrostatic lenses. Referring to FIG. 31, according to further embodiments, the circular eye-center 3110 of lens 3100 may not intersect the membrane edge. Here, no neutral points exist, and an upward pull of the membrane may not be required. FIG. 32 shows one example of a spherical lens shape generated through controlled zip-in actuation at the non-round lens boarder. In some embodiments, such edge-actuated displacements may create a uniform lens power distribution over the eye center, as shown in FIG. 33. With reference to FIG. 34, sectional profiles taken at angles of −45°, 0°, 45°, and 90° highlight how the electrode profile angle and membrane zipped-in length may vary around the edge of a lens. As illustrated graphically in FIG. 35, in embodiments where the membrane edge is further from the lens center (0° section), a steeper and longer pull-in length may be needed, whereas for a position where the membrane edge is closer to the lens center, the electrode profile angle may be less steep and shorter. This example also shows that the lens apex can be controlled to remain stationary under this actuation scheme. In some embodiments, the lens apex position may be spaced away from the geometric center of the lens. The design of a curved electrode can be modified to accommodate any reasonable predefined apex position for the lens and maintain it constant under actuation.

According to various embodiments, the performance of an electrostatic lens may be substantially insensitive to geometric tolerances generally, and to design tolerances for the sloped support in particular. In example embodiments, the optical performance of an electrostatic lens may be substantially unaffected by sloped support height tolerance variations, including variations of up to approximately 10 μm in amplitude or more.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

Figure 36:
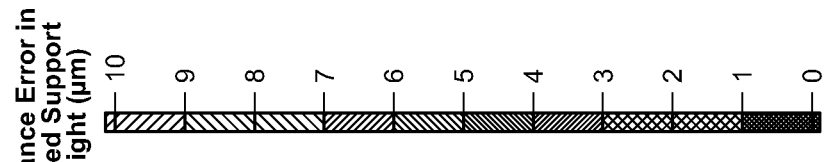
FIG. 36 shows a contour plot of two forms of tolerancing errors in the height of a sloped support for an exemplary circular varifocal electrostatic lens according to some embodiments.
Figure 36:
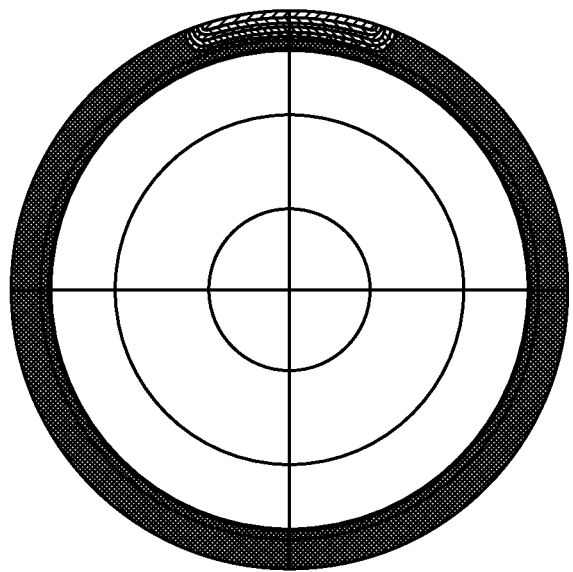
Figure 36:
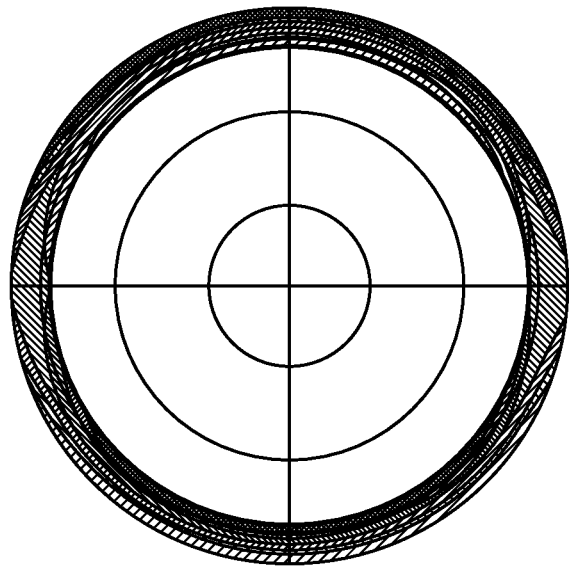
Figure 37:
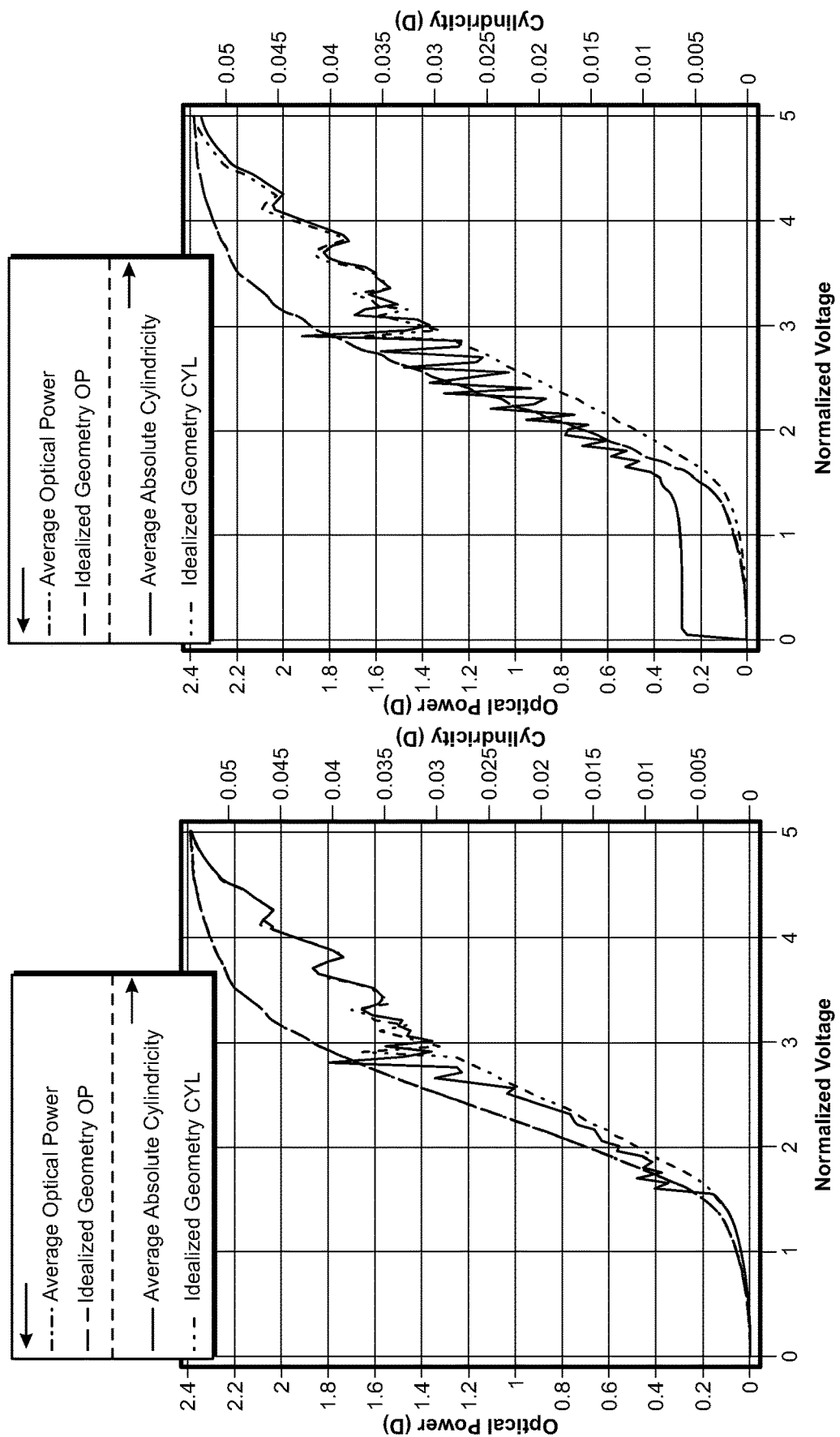
FIG. 37 shows the error in average optical power and cylindricity as a function of applied voltage resulting from the sloped support tolerances depicted in FIG. 36 according to some embodiments.

Referring to FIG. 36, shown are contour plots of global (left) and local (right) forms of tolerance errors in the height of the sloped support for a circular lens. The deviation in optical power and cylindricity during actuation for both cases is shown in FIG. 37. The results show that the optical properties are marginally affected by these tolerance errors.

According to further embodiments disclosed herein, a barrier coating may be used to control the transpiration (diffusion) of, for example, the lens fluid through the lens membrane. In some embodiments, the barrier coating or a coating in lieu of or in addition to the barrier coating may be used to control the mechanical properties of the membrane. For instance, the maximum strain at the top of the lens membrane may be decreased by adding a reinforcement layer to at least a portion of the membrane.

Figure 38:
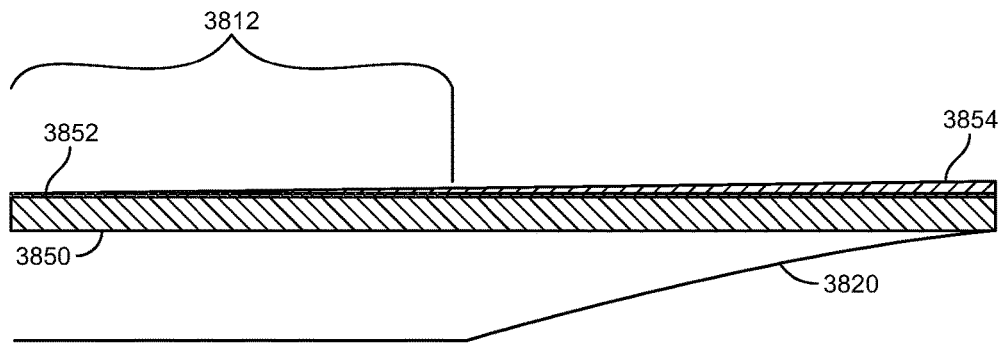
FIG. 38 shows the incorporation of a reinforcement layer over a top surface of a lens membrane according to various embodiments.
Figure 39:
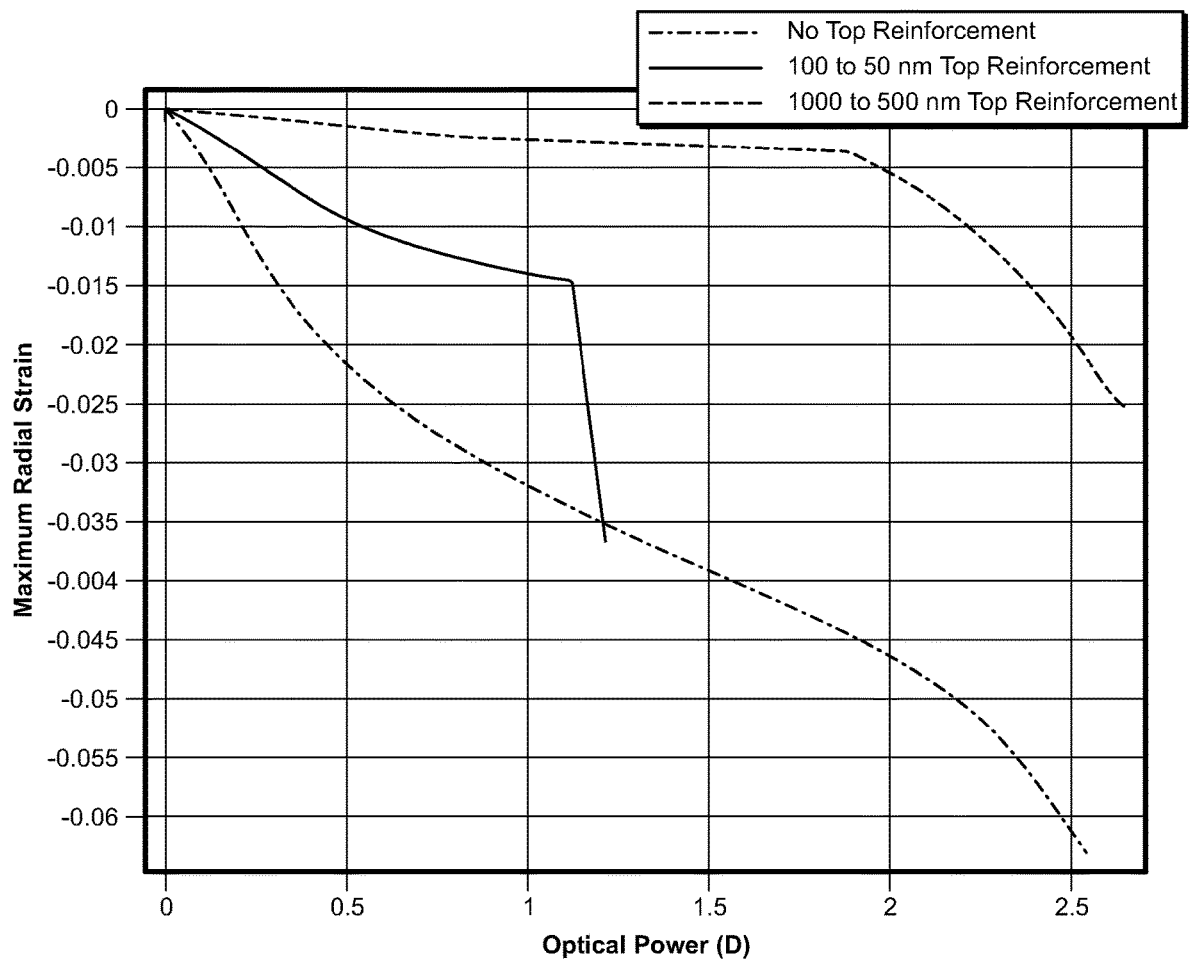
FIG. 39 is a plot of maximum radial strain on a top surface of a lens membrane with and without the reinforcement layer of FIG. 38 according to some embodiments.

Referring to FIG. 38, lens membrane 3850 overlies a sloped support 3820. A barrier coating 3852 is disposed over a top surface of the membrane. In addition, a reinforcement layer 3854 is disposed over the barrier coating 3852 outside of the optical aperture 3812, i.e., over the sloped portion of the sloped support 3820. To decrease stress and strain concentrations proximate to the edges of the membrane 3850, the thickness of the reinforcement layer may vary, e.g., tapering to smaller values near the optical aperture 3812. Without wishing to be bound by theory, the reinforcement layer 3854 may shift the neutral axis of the membrane and, as shown in FIG. 39, lead to lower total strain.

Figure 40:
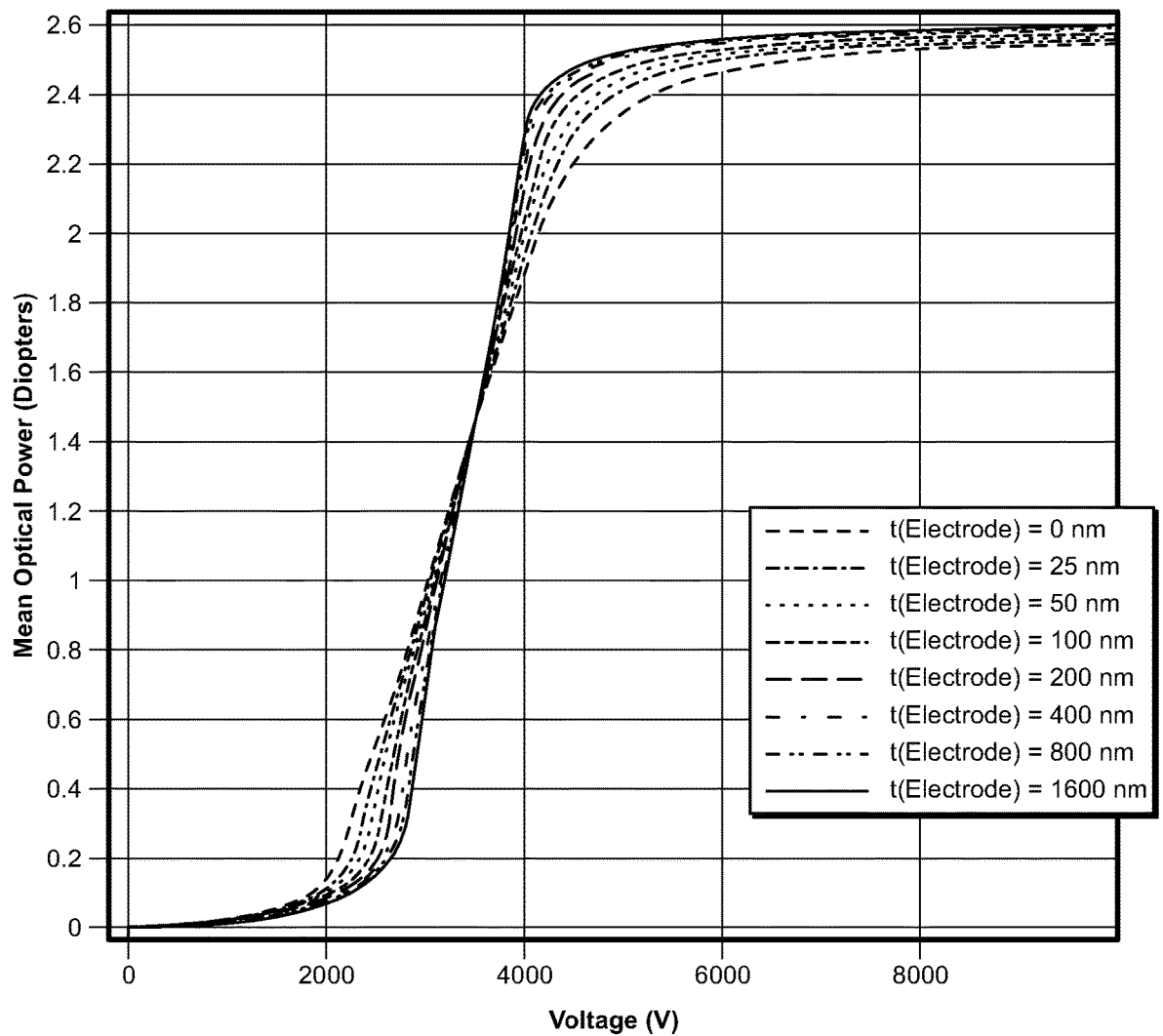
FIG. 40 shows the relationship between optical power and voltage as a function of the thickness of a compliant electrode according to some embodiments.
Figure 41:
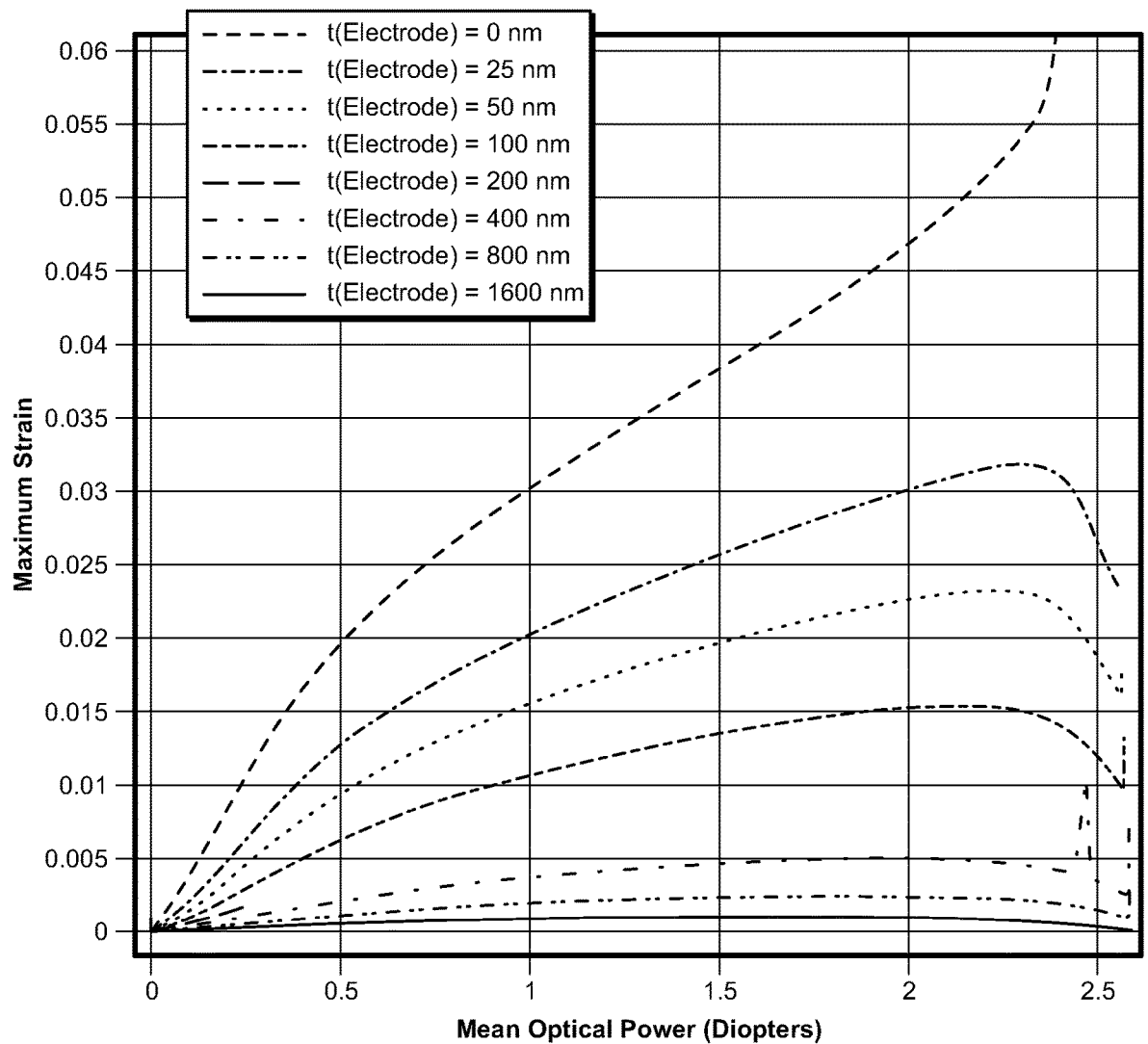
FIG. 41 shows a plot of the maximum strain on an electrode as a function of electrode thickness according to some embodiments.

In some embodiments, the reinforcement layer may include the secondary electrode. That is, the secondary electrode overlying a portion of the deformable lens membrane may itself provide a reinforcement function. Turning to FIG. 40, shown is the relationship between optical power and applied voltage for electrode thicknesses ranging from 0 nm to 1600 nm. In some examples, the optical power of the lens may be more sensitive to voltage changes for increased electrode thickness. Referring to FIG. 41, shown is a plot of maximum strain versus optical power for various electrode thicknesses where, for increasing electrode thickness, the neutral plane shifts toward the electrode decreasing the strain within the membrane.

Actuation dynamics within a varifocal electrostatic lens, including the speed, precision, accuracy, reproducibility, etc. associated with the acts of zipping and unzipping, may be affected by the hydrodynamics of the lens fluid. In some embodiments, the volume of lens fluid located between the membrane and the substrate, i.e., a primary fluid volume, may be supplemented by a secondary fluid. The secondary fluid may be located within a secondary fluid volume, which may be separate from but in fluid communication with the primary fluid volume. In certain embodiments, the secondary fluid may be directed in and out of the primary fluid volume to adjust the optical power and/or tune the optical quality of the liquid lens.

Figure 42:
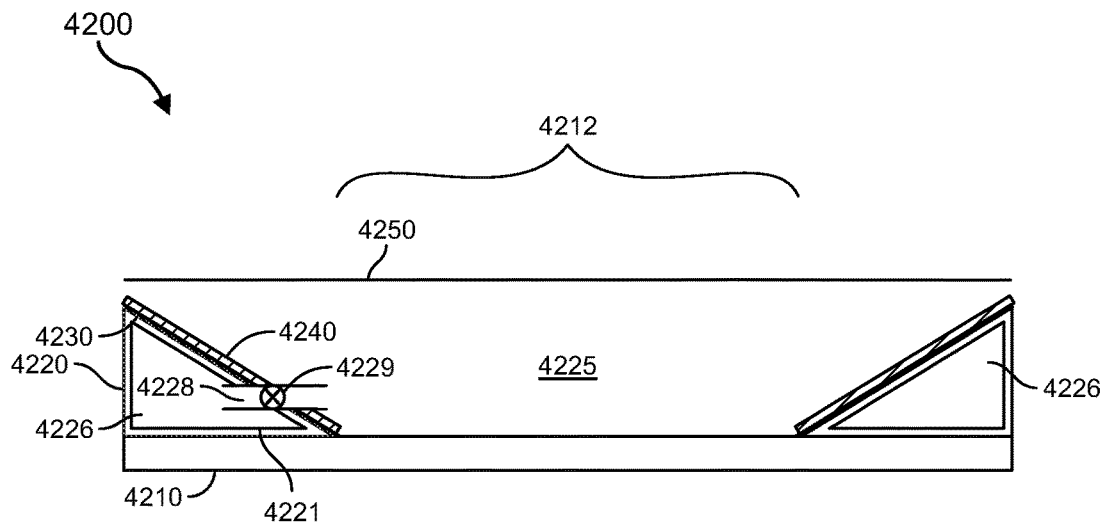
FIG. 42 shows a cross-sectional view of an example support profile containing a secondary fluid volume according to some embodiments.

Referring to FIG. 42, a secondary fluid volume 4226 may be located within a portion of a sloped support 4220 between the substrate 4210 and the sloped region of the support, although other locations are contemplated, such as the temple region of a wearable augmented reality or virtual reality device. The primary fluid volume 4225 and the secondary fluid volume 4226 may be in fluid communication via a fluid channel 4228 that may extend through the primary electrode 4230 and the dielectric layer 4240, where fluid flow through the fluid channel 4228 may be regulated using a fluid valve 4229. A fluid valve, if provided, may be operated mechanically, magnetically, or electrostatically. In an example system, a deformable pouch 4221 may define the secondary fluid volume 4226, and fluid within the secondary fluid volume may be pumped into the primary fluid volume 4225 by compressing the deformable pouch 4221, which may deform the membrane 4250 within optical aperture 4212.

According to further embodiments, a varifocal electrostatic lens may include a primary fluid volume that is fluidically isolated from a secondary fluid volume. A sealed deformable pouch, for example, may define the secondary fluid volume. During operation, the lens fluid within the secondary fluid volume may impinge on the lens fluid within the primary fluid volume without comingling of the fluids. With such a configuration, certain aspects of the primary and secondary fluids may differ, including their respective composition, viscosity, breakdown strength, etc. The two fluids may be independently selected to enable faster zipping dynamics, for example, and/or to inhibit the propensity for dielectric failure of either fluid.

Figure 43:
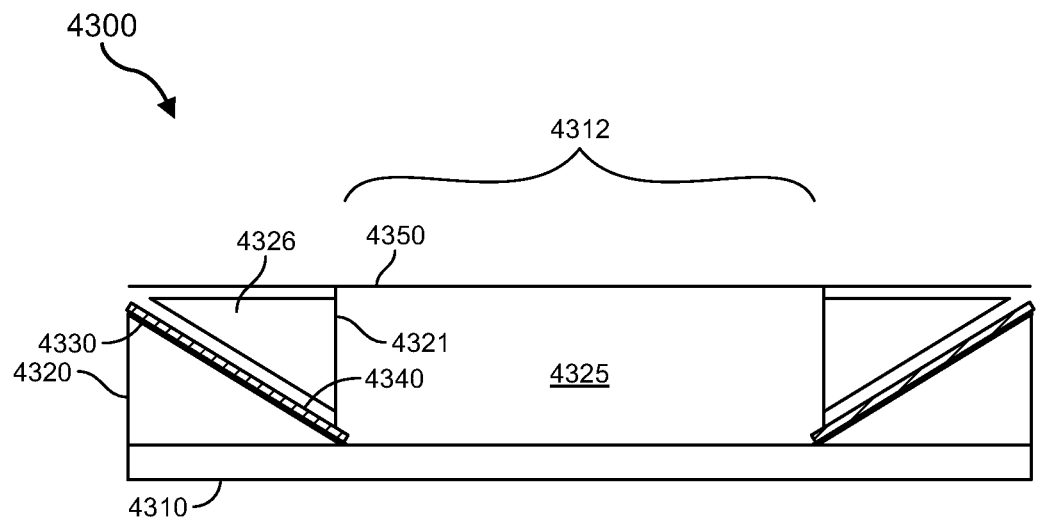
FIG. 43 shows a cross-sectional schematic illustration of a varifocal electrostatic lens including a separate fluid volume located over a sloped support peripheral to an optically active area of the lens according to some embodiments.
Figure 44:
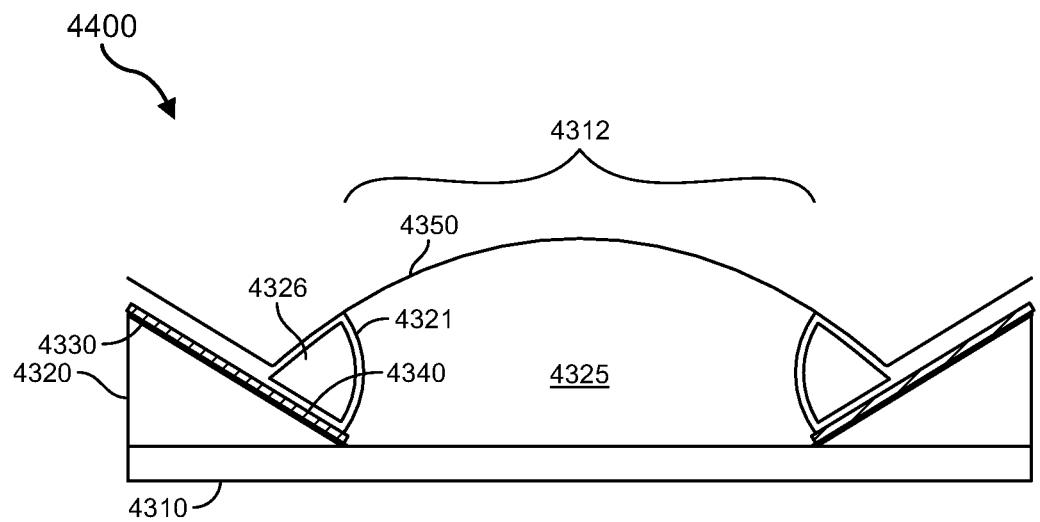
FIG. 44 is a schematic illustration showing the effects of applying a first voltage to the varifocal electrostatic lens of FIG. 43 according to some embodiments.

Referring to FIG. 43, an example electrostatic lens 4300 may include a transparent substrate 4310, an inclined (i.e., sloped) support 4320 located peripheral to an optical aperture 4312 of lens 4300, a primary electrode 4330 disposed over the sloped support 4320, and a dielectric layer 4340 disposed over the primary electrode 4330. A deformable transparent membrane 4350 may extend over the optical aperture 4312 of the lens and may include a secondary electrode (not shown) located on either the bottom (inner) or top (outer) surface of the transparent membrane 4350 and proximate to the primary electrode.

The secondary electrode may be located within a peripheral region of the transparent membrane, outside of the optical aperture 4312. Transparent membrane 4350 may be configured to contain a primary dielectric fluid (i.e., primary lens fluid) 4325 between the membrane 4350 and the substrate 4310.

A deformable pouch 4321 located outside of the optical aperture 4312, i.e., over the sloped portion of the sloped support 4320, may separate the primary dielectric fluid 4325 from a secondary dielectric fluid 4326 located within the deformable pouch 4321. As shown schematically in FIG. 44, during actuation (i.e., zipping and unzipping) the deformable pouch 4321 may impinge on the primary dielectric fluid 4325 located inside the optical aperture 4312 and induce a change in the shape of the lens membrane 4350.

As disclosed herein, a varifocal lens such as a liquid lens may include a peripheral electrostatic actuator having a dielectric layer located between paired electrodes. A primary electrode may be attached to a support surface of the lens, such as a sloped region of the lens frame, while a secondary electrode may be attached to the lens membrane. The application of a voltage between the electrodes may induce an electrostatic force that draws the electrodes together and correspondingly adjusts the shape of the lens membrane as the paired electrodes are zipped together or unzipped apart. Various embodiments include strategies for mitigating stiction, i.e., static friction, such as between the dielectric layer and the secondary electrode that prevents debonding (unzipping) even in the absence of an applied voltage. Approaches for overcoming stiction may include applying an external force, e.g., using a lens-mounted transducer or ultrasonication, and roughening or patterning one or both of the contact surfaces to decrease the contact area therebetween. Also disclosed are various drive schemes for operating the electrostatic actuator, such as a pulsed drive scheme. Segmented electrodes, electrodes having a locally variable geometry and/or support surfaces having a locally variable geometry, may be used to tune the electrostatic response and correspondingly control the sphericity and cylindricity of the lens. The formation of channel regions, such as in a surface of the dielectric layer, may enable faster fluid dynamics and hence improved focus control.

According to some embodiments, a pair of electrostatic liquid lenses may be electrically connected such that a first lens is in an actuated state where a high voltage is applied, and a second lens is in an equal, greater, or lesser actuated state, and where electrical power from the first lens may be controllably transferred to the second lens.

EXAMPLE EMBODIMENTS

Example 1: A varifocal lens includes a substrate having an inclined region, a primary electrode disposed over the inclined region of the substrate, a dielectric layer disposed over the primary electrode, a deformable membrane disposed over and at least partially spaced away from the dielectric layer, a secondary electrode disposed over a surface of the deformable membrane facing toward or away from the dielectric layer and overlying at least a portion of the primary electrode, and a primary fluid between the deformable membrane and the substrate, where a surface of the dielectric layer facing the secondary electrode comprises a textured surface.

Example 2: The varifocal lens of Example 1, where the inclined region is located peripheral to an optically active area of the lens.

Example 3: The varifocal lens of Example 2, further including a secondary fluid located outside of the optically active area.

Example 4: The varifocal lens of Example 3, where the secondary fluid is in fluid communication with the primary fluid.

Example 5: The varifocal lens of any of Examples 1-4, wherein a slope of the inclined region varies as a function of position.

Example 6: The varifocal lens of any of Examples 1-5, where the primary electrode is bonded to the inclined region of the substrate.

Example 7: The varifocal lens of any of Examples 1-6, where the deformable membrane is bonded to the substrate.

Example 8: The varifocal lens of any of Examples 1-7, where the secondary electrode is bonded to the surface of the deformable membrane.

Example 9: The varifocal lens of any of Examples 1-8, where a surface of the dielectric layer facing the secondary electrode includes one or more fluid channels.

Example 10: The varifocal lens of any of Examples 1-9, where a thickness of the deformable membrane varies with position.

Example 11: The varifocal lens of any of Examples 1-10, further including an elastic spacer located between the primary electrode and the secondary electrode.

Example 12: The varifocal lens of any of Examples 1-11, further including a barrier coating disposed over at least one surface of the deformable membrane.

Example 13: The varifocal lens of any of Examples 1-12, further including a hydrophilic layer disposed over the secondary electrode facing the dielectric layer and a hydrophobic layer disposed over the dielectric layer facing the secondary electrode.

Example 14: An actuator assembly includes (a) a primary substrate having an inclined region, (b) a primary electrode affixed to the inclined region of the primary substrate, (c) a secondary electrode disposed over and spaced away from the primary electrode, the secondary electrode affixed to a secondary substrate, and (d) an elastic spacer disposed between and contacting each of the primary electrode and the secondary electrode.

Example 15: The actuator assembly of Example 14, where the secondary substrate includes a deformable transparent membrane.

Example 16: The actuator assembly of any of Examples 14 and 15, further including a dielectric layer disposed over the primary electrode.

Example 17: The actuator assembly of any of Examples 14-16, further including a dielectric layer disposed over the primary electrode and spaced away from the elastic spacer.

Example 18: The actuator assembly of any of Examples 14-17, where the inclined region includes a peripheral area of the primary substrate.

Example 19: A method includes forming a primary electrode directly over an inclined region of a primary substrate, forming a secondary electrode directly over a secondary substrate, the secondary substrate located over and at least partially spaced away from the primary electrode, applying a first voltage gradient between the primary electrode and the secondary electrode to decrease a distance between the secondary substrate and the primary substrate within the inclined region, and applying a second voltage gradient less than the first voltage gradient to increase the distance between the secondary substrate and the primary substrate within the inclined region.

Example 20: The method of Example 19, further including applying a mechanical force to the secondary substrate during the act of applying the second voltage.

Example 21: The varifocal lens of Example 11, where the elastic spacer is characterized by a pillar or a ribbed shape.

Example 22: The varifocal lens of any of Examples 1-13, further including a transducer mounted to at least one of the substrate and the deformable membrane, where the transducer is configured to apply a mechanical force to the deformable membrane.

Example 23: The varifocal lens of any of Examples 1-13, where at least one of the primary electrode and the secondary electrode includes two or more independently-driven segments.

Example 24: A heads-up display including the varifocal lens of any of Examples 1-13.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 4500 in FIG. 45) or that visually immerses a user in an artificial reality (e.g., virtual-reality system 4600 in FIG. 46). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 45:
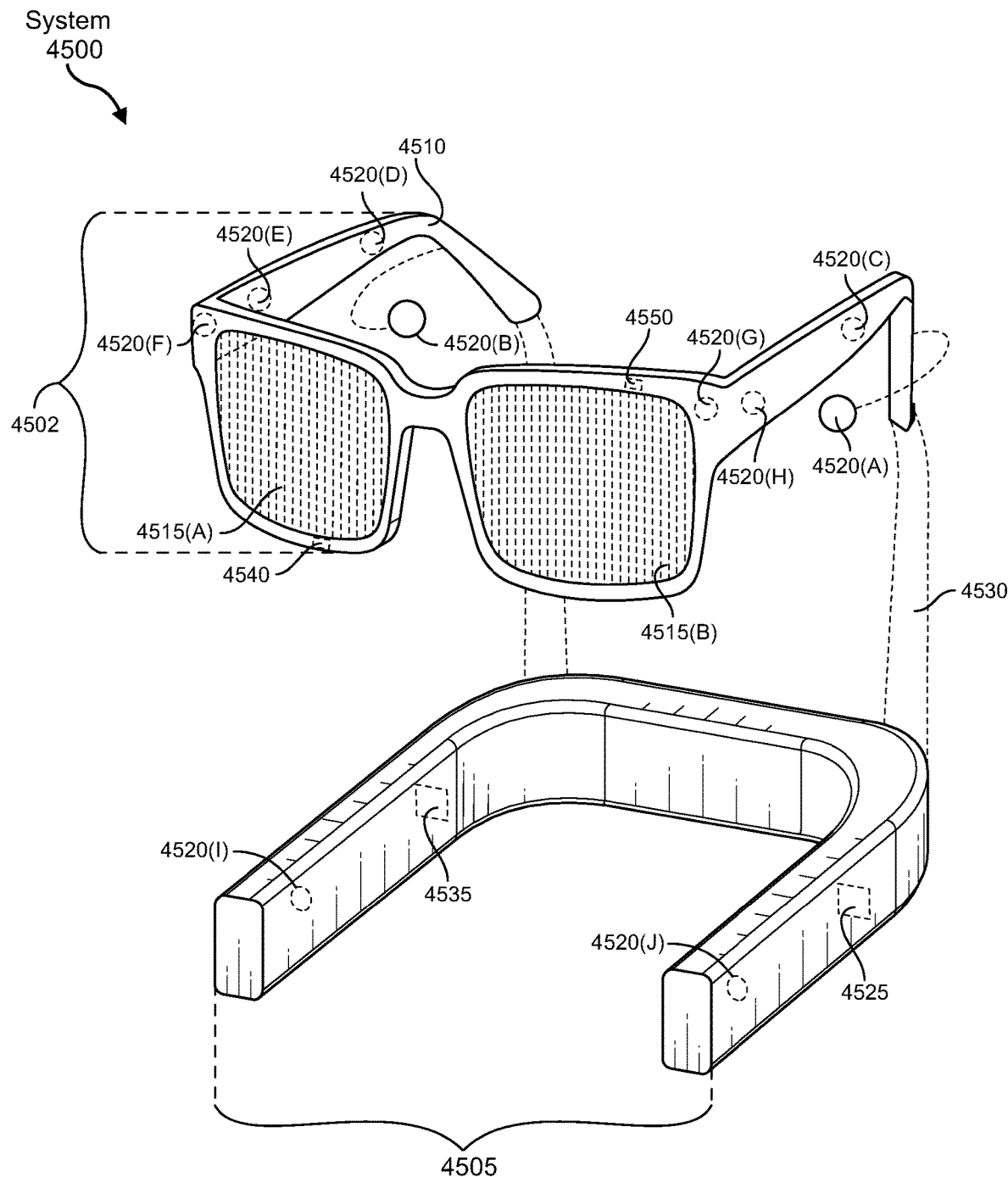
FIG. 45 is an illustration of exemplary augmented-reality glasses that may be used in connection with embodiments of this disclosure.

Turning to FIG. 45, augmented-reality system 4500 may include an eyewear device 4502 with a frame 4510 configured to hold a left display device 4515(A) and a right display device 4515(B) in front of a user's eyes. Display devices 4515(A) and 4515(B) may act together or independently to present an image or series of images to a user. While augmented-reality system 4500 includes two displays, embodiments of this disclosure may be implemented in augmented-reality systems with a single NED or more than two NEDs.

In some embodiments, augmented-reality system 4500 may include one or more sensors, such as sensor 4540. Sensor 4540 may generate measurement signals in response to motion of augmented-reality system 4500 and may be located on substantially any portion of frame 4510. Sensor 4540 may represent a position sensor, an inertial measurement unit (IMU), a depth camera assembly, a structured light emitter and/or detector, or any combination thereof. In some embodiments, augmented-reality system 4500 may or may not include sensor 4540 or may include more than one sensor. In embodiments in which sensor 4540 includes an IMU, the IMU may generate calibration data based on measurement signals from sensor 4540. Examples of sensor 4540 may include, without limitation, accelerometers, gyroscopes, magnetometers, other suitable types of sensors that detect motion, sensors used for error correction of the IMU, or some combination thereof.

Augmented-reality system 4500 may also include a microphone array with a plurality of acoustic transducers 4520(A)-4520(J), referred to collectively as acoustic transducers 4520. Acoustic transducers 4520 may be transducers that detect air pressure variations induced by sound waves. Each acoustic transducer 4520 may be configured to detect sound and convert the detected sound into an electronic format (e.g., an analog or digital format). The microphone array in FIG. 2 may include, for example, ten acoustic transducers: 4520(A) and 4520(B), which may be designed to be placed inside a corresponding ear of the user, acoustic transducers 4520(C), 4520(D), 4520(E), 4520(F), 4520(G), and 4520(H), which may be positioned at various locations on frame 4510, and/or acoustic transducers 4520(I) and 4520(J), which may be positioned on a corresponding neckband 4505.

In some embodiments, one or more of acoustic transducers 4520(A)-(F) may be used as output transducers (e.g., speakers). For example, acoustic transducers 4520(A) and/or 4520(B) may be earbuds or any other suitable type of headphone or speaker.

The configuration of acoustic transducers 4520 of the microphone array may vary. While augmented-reality system 4500 is shown in FIG. 45 as having ten acoustic transducers 4520, the number of acoustic transducers 4520 may be greater or less than ten. In some embodiments, using higher numbers of acoustic transducers 4520 may increase the amount of audio information collected and/or the sensitivity and accuracy of the audio information. In contrast, using a lower number of acoustic transducers 4520 may decrease the computing power required by an associated controller 4550 to process the collected audio information. In addition, the position of each acoustic transducer 4520 of the microphone array may vary. For example, the position of an acoustic transducer 4520 may include a defined position on the user, a defined coordinate on frame 4510, an orientation associated with each acoustic transducer 4520, or some combination thereof.

Acoustic transducers 4520(A) and 4520(B) may be positioned on different parts of the user's ear, such as behind the pinna, behind the tragus, and/or within the auricle or fossa. Or, there may be additional acoustic transducers 4520 on or surrounding the ear in addition to acoustic transducers 4520 inside the ear canal. Having an acoustic transducer 4520 positioned next to an ear canal of a user may enable the microphone array to collect information on how sounds arrive at the ear canal. By positioning at least two of acoustic transducers 4520 on either side of a user's head (e.g., as binaural microphones), augmented-reality device 4500 may simulate binaural hearing and capture a 3D stereo sound field around about a user's head. In some embodiments, acoustic transducers 4520(A) and 4520(B) may be connected to augmented-reality system 4500 via a wired connection 4530, and in other embodiments acoustic transducers 4520(A) and 4520(B) may be connected to augmented-reality system 4500 via a wireless connection (e.g., a Bluetooth connection). In still other embodiments, acoustic transducers 4520(A) and 4520(B) may not be used at all in conjunction with augmented-reality system 4500.

Acoustic transducers 4520 on frame 4510 may be positioned along the length of the temples, across the bridge, above or below display devices 4515(A) and 4515(B), or some combination thereof. Acoustic transducers 4520 may be oriented such that the microphone array is able to detect sounds in a wide range of directions surrounding the user wearing the augmented-reality system 4500. In some embodiments, an optimization process may be performed during manufacturing of augmented-reality system 4500 to determine relative positioning of each acoustic transducer 4520 in the microphone array.

In some examples, augmented-reality system 4500 may include or be connected to an external device (e.g., a paired device), such as neckband 4505. Neckband 4505 generally represents any type or form of paired device. Thus, the following discussion of neckband 4505 may also apply to various other paired devices, such as charging cases, smart watches, smart phones, wrist bands, other wearable devices, hand-held controllers, tablet computers, laptop computers, other external compute devices, etc.

As shown, neckband 4505 may be coupled to eyewear device 4502 via one or more connectors. The connectors may be wired or wireless and may include electrical and/or non-electrical (e.g., structural) components. In some cases, eyewear device 4502 and neckband 4505 may operate independently without any wired or wireless connection between them. While FIG. 45 illustrates the components of eyewear device 4502 and neckband 4505 in example locations on eyewear device 4502 and neckband 4505, the components may be located elsewhere and/or distributed differently on eyewear device 4502 and/or neckband 4505. In some embodiments, the components of eyewear device 4502 and neckband 4505 may be located on one or more additional peripheral devices paired with eyewear device 4502, neckband 4505, or some combination thereof.

Pairing external devices, such as neckband 4505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 4500 may be provided by a paired device or shared between a paired device and an eyewear device, thus reducing the weight, heat profile, and form factor of the eyewear device overall while still retaining desired functionality. For example, neckband 4505 may allow components that would otherwise be included on an eyewear device to be included in neckband 4505 since users may tolerate a heavier weight load on their shoulders than they would tolerate on their heads. Neckband 4505 may also have a larger surface area over which to diffuse and disperse heat to the ambient environment. Thus, neckband 4505 may allow for greater battery and computation capacity than might otherwise have been possible on a stand-alone eyewear device. Since weight carried in neckband 4505 may be less invasive to a user than weight carried in eyewear device 4502, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 4505 may be communicatively coupled with eyewear device 4502 and/or to other devices. These other devices may provide certain functions (e.g., tracking, localizing, depth mapping, processing, storage, etc.) to augmented-reality system 4500. In the embodiment of FIG. 45, neckband 4505 may include two acoustic transducers (e.g., 4520(I) and 4520(J)) that are part of the microphone array (or potentially form their own microphone subarray). Neckband 4505 may also include a controller 4525 and a power source 4535.

Acoustic transducers 4520(I) and 4520(J) of neckband 4505 may be configured to detect sound and convert the detected sound into an electronic format (analog or digital). In the embodiment of FIG. 45, acoustic transducers 4520(I) and 4520(J) may be positioned on neckband 4505, thereby increasing the distance between the neckband acoustic transducers 4520(I) and 4520(J) and other acoustic transducers 4520 positioned on eyewear device 4502. In some cases, increasing the distance between acoustic transducers 4520 of the microphone array may improve the accuracy of beamforming performed via the microphone array. For example, if a sound is detected by acoustic transducers 4520(C) and 4520(D) and the distance between acoustic transducers 4520(C) and 4520(D) is greater than, e.g., the distance between acoustic transducers 4520(D) and 4520(E), the determined source location of the detected sound may be more accurate than if the sound had been detected by acoustic transducers 4520(D) and 4520(E).

Controller 4525 of neckband 4505 may process information generated by the sensors on neckband 4505 and/or augmented-reality system 4500. For example, controller 4525 may process information from the microphone array that describes sounds detected by the microphone array. For each detected sound, controller 4525 may perform a direction-of-arrival (DOA) estimation to estimate a direction from which the detected sound arrived at the microphone array. As the microphone array detects sounds, controller 4525 may populate an audio data set with the information. In embodiments in which augmented-reality system 4500 includes an inertial measurement unit, controller 4525 may compute all inertial and spatial calculations from the IMU located on eyewear device 4502. A connector may convey information between augmented-reality system 4500 and neckband 4505 and between augmented-reality system 4500 and controller 4525. The information may be in the form of optical data, electrical data, wireless data, or any other transmittable data form. Moving the processing of information generated by augmented-reality system 4500 to neckband 4505 may reduce weight and heat in eyewear device 4502, making it more comfortable to the user.

Power source 4535 in neckband 4505 may provide power to eyewear device 4502 and/or to neckband 4505. Power source 4535 may include, without limitation, lithium ion batteries, lithium-polymer batteries, primary lithium batteries, alkaline batteries, or any other form of power storage. In some cases, power source 4535 may be a wired power source. Including power source 4535 on neckband 4505 instead of on eyewear device 4502 may help better distribute the weight and heat generated by power source 4535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 4600 in FIG. 46, that mostly or completely covers a user's field of view. Virtual-reality system 4600 may include a front rigid body 4602 and a band 4604 shaped to fit around a user's head. Virtual-reality system 4600 may also include output audio transducers 4606(A) and 4606(B). Furthermore, while not shown in FIG. 46, front rigid body 4602 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 4500 and/or virtual-reality system 4600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 4500 and/or virtual-reality system 4600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 4500 and/or virtual-reality system 4600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 45, output audio transducers 4606(A) and 4606(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 45, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 4500 and 4600 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 47:
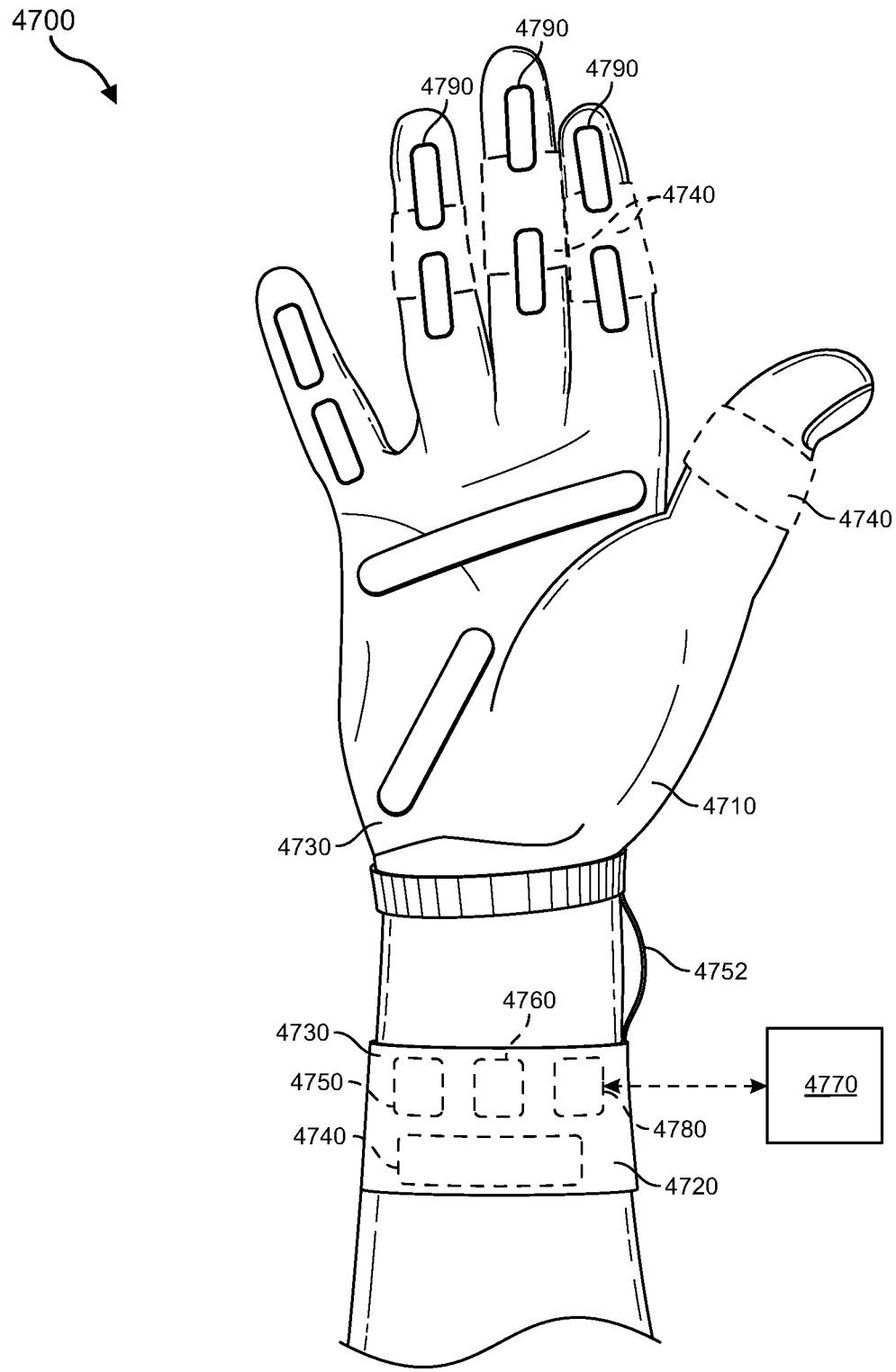
FIG. 47 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 47 illustrates a vibrotactile system 4700 in the form of a wearable glove (haptic device 4710) and wristband (haptic device 4720). Haptic device 4710 and haptic device 4720 are shown as examples of wearable devices that include a flexible, wearable textile material 4730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 4740 may be positioned at least partially within one or more corresponding pockets formed in textile material 4730 of vibrotactile system 4700. Vibrotactile devices 4740 may be positioned in locations to provide a vibrating sensation (e.g., haptic feedback) to a user of vibrotactile system 4700. For example, vibrotactile devices 4740 may be positioned against the user's finger(s), thumb, or wrist, as shown in FIG. 47. Vibrotactile devices 4740 may, in some examples, be sufficiently flexible to conform to or bend with the user's corresponding body part(s).

A power source 4750 (e.g., a battery) for applying a voltage to the vibrotactile devices 4740 for activation thereof may be electrically coupled to vibrotactile devices 4740, such as via conductive wiring 4752. In some examples, each of vibrotactile devices 4740 may be independently electrically coupled to power source 4750 for individual activation. In some embodiments, a processor 4760 may be operatively coupled to power source 4750 and configured (e.g., programmed) to control activation of vibrotactile devices 4740.

Vibrotactile system 4700 may be implemented in a variety of ways. In some examples, vibrotactile system 4700 may be a standalone system with integral subsystems and components for operation independent of other devices and systems. As another example, vibrotactile system 4700 may be configured for interaction with another device or system 4770. For example, vibrotactile system 4700 may, in some examples, include a communications interface 4780 for receiving and/or sending signals to the other device or system 4770. The other device or system 4770 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 4780 may enable communications between vibrotactile system 4700 and the other device or system 4770 via a wireless (e.g., Wi-Fi, Bluetooth, cellular, radio, etc.) link or a wired link. If present, communications interface 4780 may be in communication with processor 4760, such as to provide a signal to processor 4760 to activate or deactivate one or more of the vibrotactile devices 4740.

Vibrotactile system 4700 may optionally include other subsystems and components, such as touch-sensitive pads 4790, pressure sensors, motion sensors, position sensors, lighting elements, and/or user interface elements (e.g., an on/off button, a vibration control element, etc.). During use, vibrotactile devices 4740 may be configured to be activated for a variety of different reasons, such as in response to the user's interaction with user interface elements, a signal from the motion or position sensors, a signal from the touch-sensitive pads 4790, a signal from the pressure sensors, a signal from the other device or system 4770, etc.

Although power source 4750, processor 4760, and communications interface 4780 are illustrated in FIG. 47 as being positioned in haptic device 4720, the present disclosure is not so limited. For example, one or more of power source 4750, processor 4760, or communications interface 4780 may be positioned within haptic device 4710 or within another wearable textile.

Figure 48:
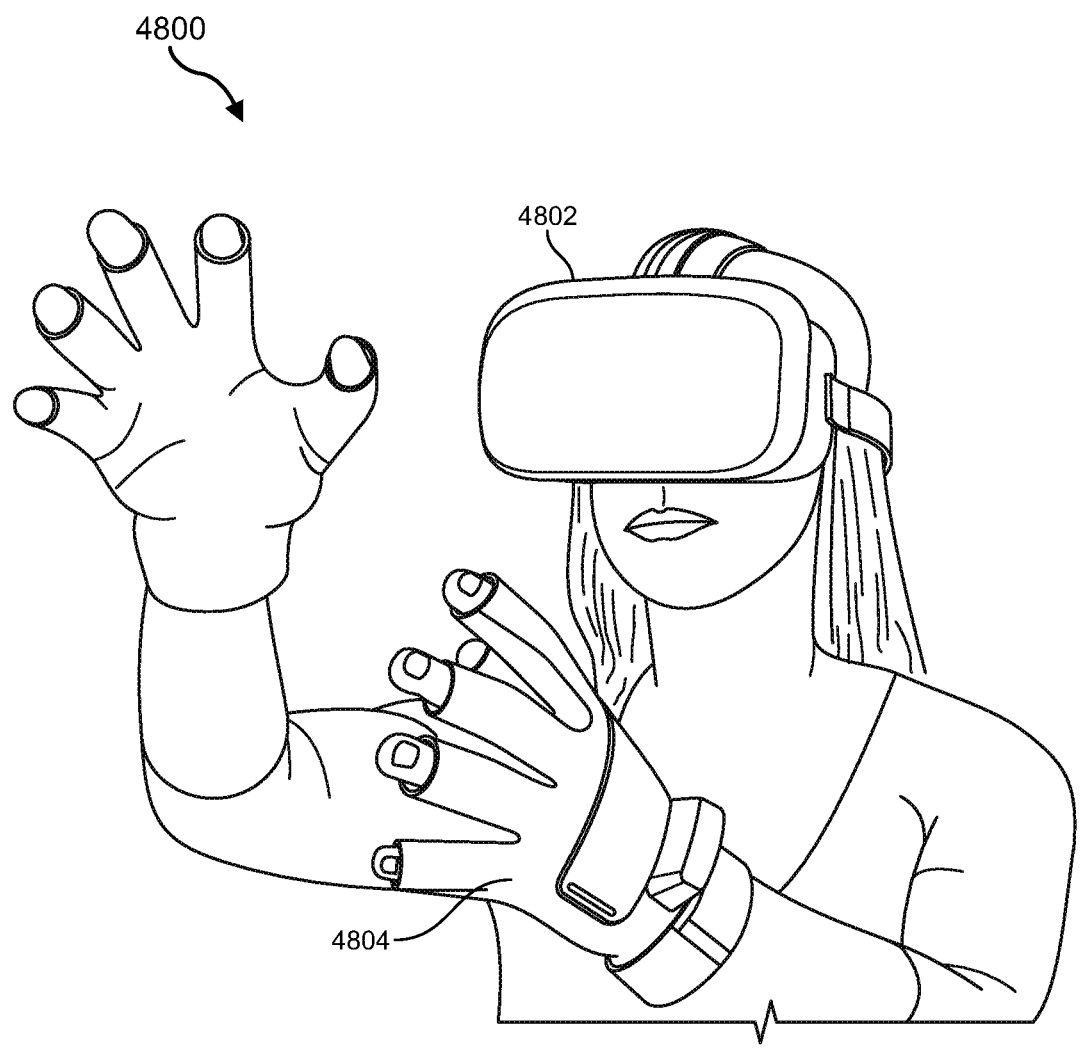
FIG. 48 is an illustration of an exemplary virtual-reality environment according to embodiments of this disclosure.

Haptic wearables, such as those shown in and described in connection with FIG. 47, may be implemented in a variety of types of artificial-reality systems and environments. FIG. 48 shows an example artificial-reality environment 4800 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 46:
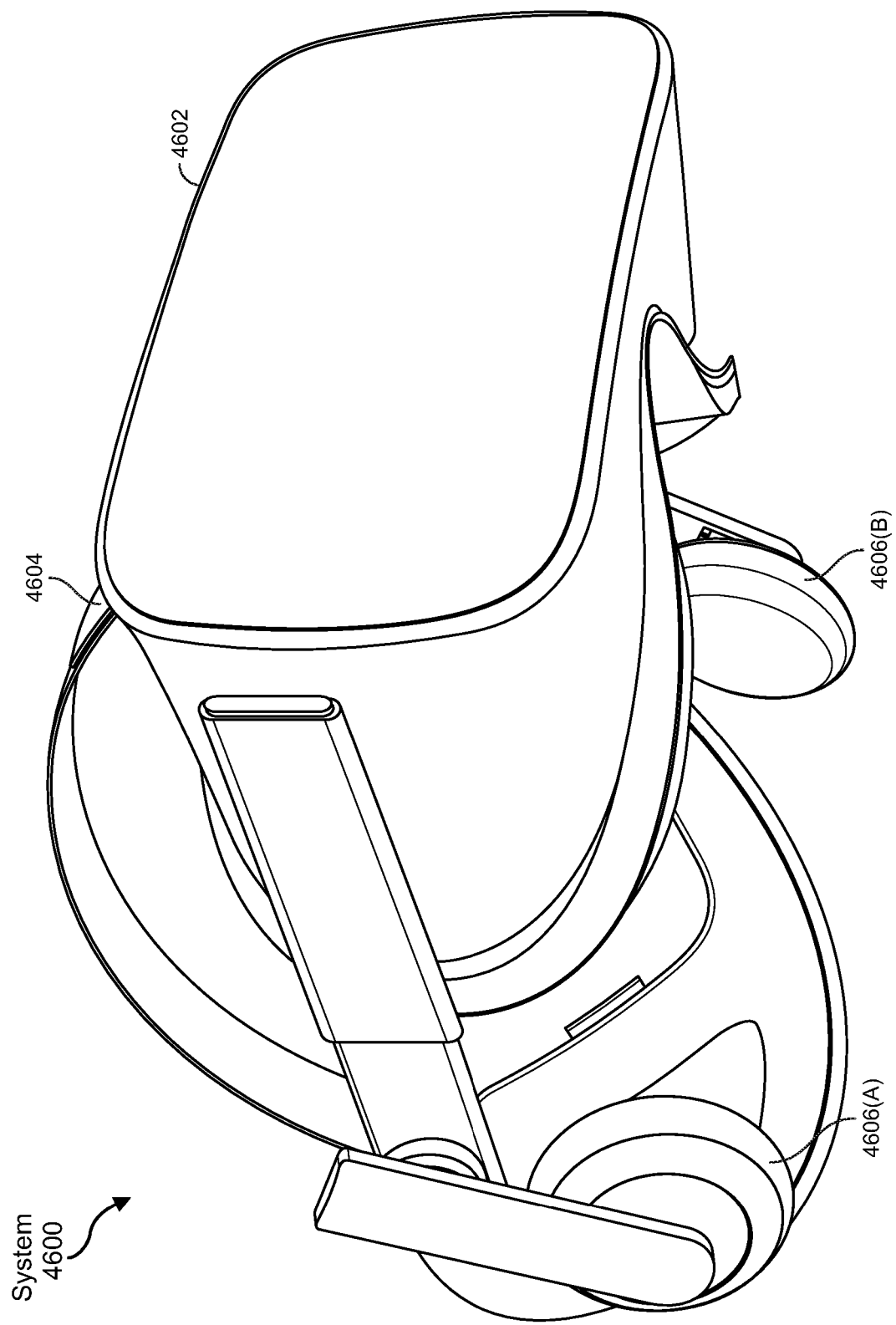
FIG. 46 is an illustration of an exemplary virtual-reality headset that may be used in connection with embodiments of this disclosure.

Head-mounted display 4802 generally represents any type or form of virtual-reality system, such as virtual-reality system 4600 in FIG. 46. Haptic device 4804 generally represents any type or form of wearable device, worn by a user of an artificial-reality system, that provides haptic feedback to the user to give the user the perception that he or she is physically engaging with a virtual object. In some embodiments, haptic device 4804 may provide haptic feedback by applying vibration, motion, and/or force to the user. For example, haptic device 4804 may limit or augment a user's movement. To give a specific example, haptic device 4804 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 4804 to send action requests to a console. Examples of action requests include, without limitation, requests to start an application and/or end the application and/or requests to perform a particular action within the application.

Figure 49:
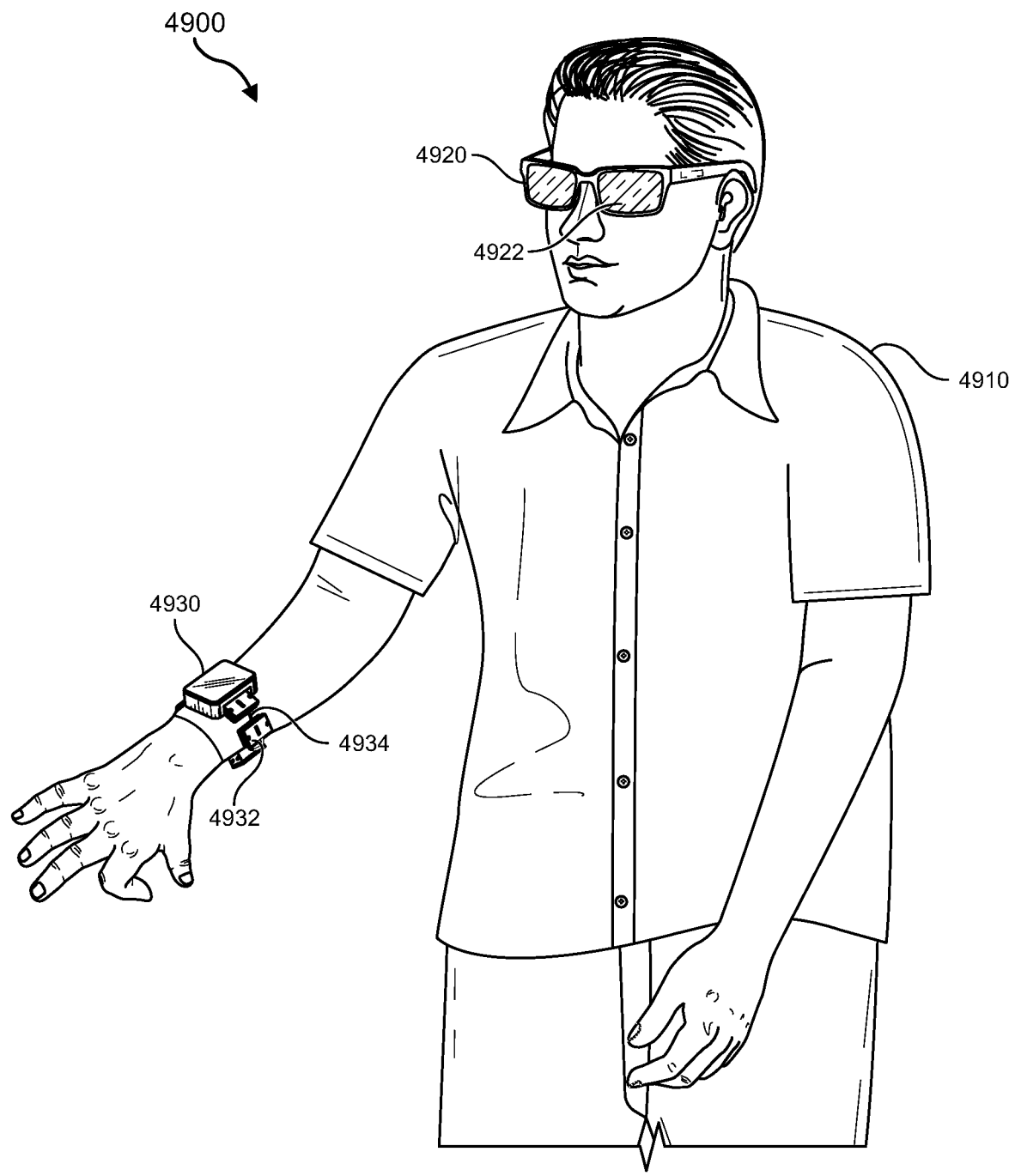
FIG. 49 is an illustration of an exemplary augmented-reality environment according to embodiments of this disclosure.

While haptic interfaces may be used with virtual-reality systems, as shown in FIG. 48, haptic interfaces may also be used with augmented-reality systems, as shown in FIG. 49. FIG. 49 is a perspective view of a user 4910 interacting with an augmented-reality system 4900. In this example, user 4910 may wear a pair of augmented-reality glasses 4920 that may have one or more displays 4922 and that are paired with a haptic device 4930. In this example, haptic device 4930 may be a wristband that includes a plurality of band elements 4932 and a tensioning mechanism 4934 that connects band elements 4932 to one another.

One or more of band elements 4932 may include any type or form of actuator suitable for providing haptic feedback. For example, one or more of band elements 4932 may be configured to provide one or more of various types of cutaneous feedback, including vibration, force, traction, texture, and/or temperature. To provide such feedback, band elements 4932 may include one or more of various types of actuators. In one example, each of band elements 4932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 4710, 4720, 4804, and 4930 may include any suitable number and/or type of haptic transducer, sensor, and/or feedback mechanism. For example, haptic devices 4710, 4720, 4804, and 4930 may include one or more mechanical transducers, piezoelectric transducers, and/or fluidic transducers. Haptic devices 4710, 4720, 4804, and 4930 may also include various combinations of different types and forms of transducers that work together or independently to enhance a user's artificial-reality experience. In one example, each of band elements 4932 of haptic device 4930 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Furthermore, for ease of use, the terms "including" and "having" (and their derivatives), as used in the specification and/or claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an electrode that comprises or includes conductive particles and a polymer matrix include embodiments where an electrode consists essentially of conductive particles and a polymer matrix and embodiments where an electrode consists of conductive particles and a polymer matrix.

What is claimed is:

1. A varifocal lens comprising:
   a substrate having an inclined region;
   a primary electrode disposed over the inclined region of the substrate;
   a dielectric layer disposed over the primary electrode;
   a deformable membrane disposed over and at least partially spaced away from the dielectric layer;
   a secondary electrode disposed over a surface of the deformable membrane facing toward or away from the dielectric layer and overlying at least a portion of the primary electrode;
   a hydrophilic layer disposed over the secondary electrode, the hydrophilic layer facing the dielectric layer; and
   a primary fluid between the deformable membrane and the substrate, wherein:
      the primary electrode and the secondary electrode have variable geometries that enable the primary electrode and secondary electrode to control, in response to an applied voltage, a shape of the deformable membrane.

2. The varifocal lens of claim 1, wherein the inclined region is located peripheral to an optically active area of the lens.

3. The varifocal lens of claim 2, further comprising a secondary fluid located outside of the optically active area.

4. The varifocal lens of claim 3, wherein the secondary fluid is in fluid communication with the primary fluid.

5. The varifocal lens of claim 1, wherein a slope of the inclined region varies as a function of position.

6. The varifocal lens of claim 1, wherein the primary electrode is bonded to the inclined region of the substrate.

7. The varifocal lens of claim 1, wherein the deformable membrane is bonded to the substrate.

8. The varifocal lens of claim 1, wherein the secondary electrode is bonded to at least one portion of at least one surface of the deformable membrane.

9. The varifocal lens of claim 1, wherein a surface of the dielectric layer facing the secondary electrode comprises one or more fluid channels.

10. The varifocal lens of claim 1, wherein a thickness of the deformable membrane varies with position.

11. The varifocal lens of claim 1, further comprising an elastic spacer located between the primary electrode and the secondary electrode.

12. The varifocal lens of claim 1, further comprising a barrier coating disposed over at least one surface of the deformable membrane.

13. The varifocal lens of claim 1, further comprising a hydrophobic layer disposed over the dielectric layer facing the secondary electrode.

* * * * *